United States Patent
Masuda et al.

(10) Patent No.: US 9,214,277 B2
(45) Date of Patent: Dec. 15, 2015

(54) CAPACITOR HAVING A PLURALITY OF MINUTE INTERNAL ELECTRODE PORTIONS FILLED BY A DIELECTRIC LAYER

(71) Applicant: Taiyo Yuden Co., Ltd., Tokyo (JP)

(72) Inventors: Hidetoshi Masuda, Tokyo (JP); Yoshinari Take, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 94 days.

(21) Appl. No.: 13/910,314

(22) Filed: Jun. 5, 2013

(65) Prior Publication Data
US 2013/0329337 A1    Dec. 12, 2013

(30) Foreign Application Priority Data
Jun. 7, 2012   (JP) .................. 2012-129573

(51) Int. Cl.
| | |
|---|---|
| *H01G 4/005* | (2006.01) |
| *H01G 4/30* | (2006.01) |
| *H01G 4/012* | (2006.01) |
| *H01G 4/232* | (2006.01) |
| *H01G 9/012* | (2006.01) |
| *H01G 9/045* | (2006.01) |
| *H01G 9/048* | (2006.01) |

(52) U.S. Cl.
CPC ............. *H01G 4/005* (2013.01); *H01G 4/012* (2013.01); *H01G 4/232* (2013.01); *H01G 4/302* (2013.01); *H01G 9/012* (2013.01); *H01G 9/045* (2013.01); *H01G 9/048* (2013.01)

(58) Field of Classification Search
CPC ....... H01G 4/302; H01G 4/005; H01G 4/232; H01G 4/012
USPC .................................. 361/303, 311
See application file for complete search history.

(56) References Cited

U.S. PATENT DOCUMENTS

| | | | | |
|---|---|---|---|---|
| 8,324,513 | B2 * | 12/2012 | Horiuchi et al. | 174/262 |
| 2009/0086404 | A1 * | 4/2009 | Masuda et al. | 361/303 |
| 2011/0013340 | A1 * | 1/2011 | Horiuchi et al. | 361/311 |
| 2012/0300360 | A1 * | 11/2012 | Take et al. | 361/301.4 |

FOREIGN PATENT DOCUMENTS

| | | | |
|---|---|---|---|
| JP | 2004273480 A | * | 9/2004 |
| JP | 4493686 B2 | | 4/2010 |

* cited by examiner

*Primary Examiner* — David M Sinclair
(74) *Attorney, Agent, or Firm* — Saliwanchik, Lloyd & Eisenschenk

(57) ABSTRACT

A capacitor includes a dielectric layer, a first external electrode layer, a second external electrode layer, a first internal electrode portion, a second internal electrode portion, and a close contact portion. The dielectric layer includes a first surface, a second surface facing the first surface, and a plurality of through-holes communicating between the first surface and the second surface. The first internal electrode portion is provided on a first through-hole portion. The second internal electrode portion is provided on a second through-hole portion. The close contact portion brings at least one of the first external electrode layer and the second external electrode layer into close contact with the dielectric layer, the close contact portion being provided on a third through-hole portion, the third through-hole portion being the remaining portion of the plurality of through-holes.

4 Claims, 17 Drawing Sheets

CAPACITOR HAVING A PLURALITY OF MINUTE INTERNAL ELECTRODE PORTIONS FILLED BY A DIELECTRIC LAYER

CROSS-REFERENCE TO RELATED APPLICATION

This application claims priority under 35 U.S.C. §119 to Japanese Patent Application No. JP 2012-129573 filed on Jun. 7, 2012, the entire content of which is hereby incorporated herein by reference in its entirety.

FIELD

The present disclosure relates to a capacitor having a configuration in which a plurality of minute internal electrodes are filled in a dielectric layer.

BACKGROUND

As a capacitor used widely at present, for example, an Al-electrolytic capacitor or a laminated ceramic capacitor has been known. Because the Al-electrolytic capacitor uses an electrolyte solution, it needs countermeasures against liquid leakage and the like. Moreover, because the laminated ceramic capacitor is manufactured through a calcination treatment, it needs to solve various problems caused due to thermal contraction between an electrode and a dielectric.

On the other hand, in recent years, as a new capacitor, a capacitor in which an insulating layer obtained by applying an anodic oxidation treatment to aluminum oxide is used as a dielectric layer is proposed. For example, Japanese Patent No. 4493686 discloses a capacitor including a pair of conductor layers, a dielectric layer, a plurality of minute holes, and first and second internal electrodes, the dielectric layer being provided between the pair of conductor layers, the plurality of minute holes having a substantially columnar shape, the plurality of minute holes being formed so as to penetrate the dielectric layer in a direction substantially perpendicular to the pair of conductive layers, the first and second internal electrodes being filled in the plurality of holes. The first internal electrode is filled in a part of the plurality of holes. One end of the first internal electrode is electrically connected to one of the conductor layers, and the other end of the first internal electrode is insulated from the other conduct layer. The second internal electrode is filled in a hole out of the plurality of holes, which is not filled with the first electrode. One end of the second internal electrode is electrically connected to the other conductor layer, and the other end of the second internal electrode is insulated from the one layer.

The capacitor having such a configuration does not need an electrolyte solution or a calcination treatment. Therefore, it is possible to overcome the problem of the Al-electrolytic capacitor or laminated ceramic capacitor. Moreover, because the first and second internal electrodes to be filled in the dielectric layer have a nanoscale microstructure, the entire element can be downsized. Furthermore, because the first and second internal electrodes are connected to the pair of conductor layers in parallel, it is possible to increase the capacity of an element.

SUMMARY

In the capacitor disclosed in Japanese Patent No. 4493686, since the first and second internal electrodes have a nanoscale microstructure, the connection area of the first and second internal electrodes with the pair of conductor layers, which are formed on both surfaces of the dielectric layer, is very small with respect to the element area. Therefore, the interface between the dielectric layer and the conductor layer may be removed due to an effect of stress or the like, thereby reducing the element properties.

In view of the circumstances as described above, it is desirable to provide a capacitor capable of improving the adhesiveness between the dielectric layer and the conductor layer.

According to an embodiment of the present disclosure, there is provided a capacitor including a dielectric layer, a first external electrode layer, a second external electrode layer, a first internal electrode portion, a second internal electrode portion, and a close contact portion.

The dielectric layer includes a first surface, a second surface facing the first surface, and a plurality of through-holes communicating between the first surface and the second surface.

The first external electrode layer is disposed on the first surface.

The second external electrode layer is disposed on the second surface.

The first internal electrode portion is provided on a first through-hole portion, the first through-hole portion being a part of the plurality of through-holes, one end of the first internal electrode portion being connected to the first external electrode layer, the other end of the first internal electrode portion being insulated from the second external electrode layer.

The second internal electrode portion is provided on a second through-hole portion, the second through-hole portion being another part of the plurality of through-holes, one end of the second internal electrode portion being connected to the second external electrode layer, the other end of the second internal electrode portion being insulated from the first external electrode layer.

The close contact portion brings at least any one of the first external electrode layer and the second external electrode layer into close contact with the dielectric layer, the close contact portion being provided on a third through-hole portion, the third through-hole portion being the remaining portion of the plurality of through-holes.

These and other objects, features and advantages of the present disclosure will become more apparent in light of the following detailed description of best mode embodiments thereof, as illustrated in the accompanying drawings.

DETAILED DESCRIPTION OF THE EMBODIMENTS

Figure 1:
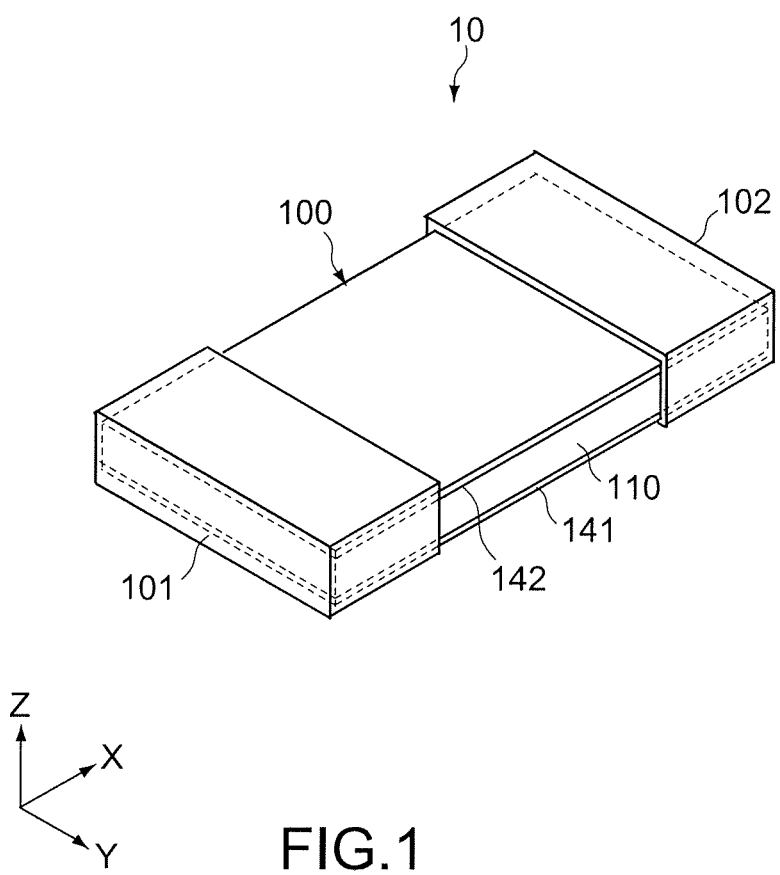
FIG. 1 is an overall perspective view showing a schematic configuration of a capacitor according to an embodiment of the present disclosure.

A capacitor according to an embodiment of the present disclosure includes a dielectric layer, a first external electrode layer, a second external electrode layer, a first internal electrode portion, a second internal electrode portion, and a close contact portion.

The dielectric layer includes a first surface, a second surface facing the first surface, and a plurality of through-holes communicating between the first surface and the second surface.

The first external electrode layer is disposed on the first surface.

The second external electrode layer is disposed on the second surface.

The first internal electrode portion is provided on a first through-hole portion, the first through-hole portion being a part of the plurality of through-holes, one end of the first internal electrode portion being connected to the first external electrode layer, the other end of the first internal electrode portion being insulated from the second external electrode layer.

The second internal electrode portion is provided on a second through-hole portion, the second through-hole portion being another part of the plurality of through-holes, one end of the second internal electrode portion being connected to the second external electrode layer, the other end of the second internal electrode portion being insulated from the first external electrode layer.

The close contact portion brings at least any one of the first external electrode layer and the second external electrode layer into close contact with the dielectric layer, the close contact portion being provided on a third through-hole portion, the third through-hole portion being the remaining portion of the plurality of through-holes.

In the capacitor, the first and second external electrode layers are brought into close contact with the first and second surfaces of the dielectric layers, respectively, by the close contact portion. Therefore, according to the capacitor, it is possible to improve the adhesiveness between the dielectric layer and the first and second external electrode layers.

The close contact portion may include a resin material layer. The resin material layer is connected to the first external electrode layer and the second external electrode layer, the resin material layer being filled in the third through-hole portion.

Accordingly, it is possible to bring the first and second external electrode layers into close contact with the first and second surfaces of the dielectric layer, respectively.

The position where the close contact portion is formed is not particularly limited, and for example, the close contact portion is provided on the periphery of the dielectric layer. Accordingly, it is possible to prevent the delamination between the first and second external electrode layers and the dielectric layer due to an effect of stress or the like.

On the other hand, the close contact portion may include a plurality of metal material layers. The plurality of metal material layers are connected to any one of the first external electrode layer and the second external electrode layer, the plurality of metal material layers being arranged on the periphery of the dielectric layer.

Also with such a configuration, it is possible to improve the adhesiveness between the first and second external electrode layers and the dielectric layer.

The dielectric layer may include a first area, a second area, and a third area. The first area includes the first through-hole portion and the second through-hole portion. The second area includes a part of the third through-hole portion, the second area being provided on an outer periphery side of the first area. The third area is provided between the first area and the second area, the third area including the remaining portion of the third through-hole portion.

In this case, the close contact portion includes a plurality of resin material layers and a plurality of metal material layers. The plurality of resin material layers is provided on the third through-hole portion in the second area, the plurality of resin material layers being connected to the first external electrode layer and the second external electrode layer.

The plurality of metal material layers is provided on the third through-hole portion in the third area, the plurality of metal material layers being connected to any one of the first external electrode layer and the second external electrode layer.

Hereinafter, embodiments according to the present disclosure will be described with reference to the drawings.

First Embodiment

Figure 2:
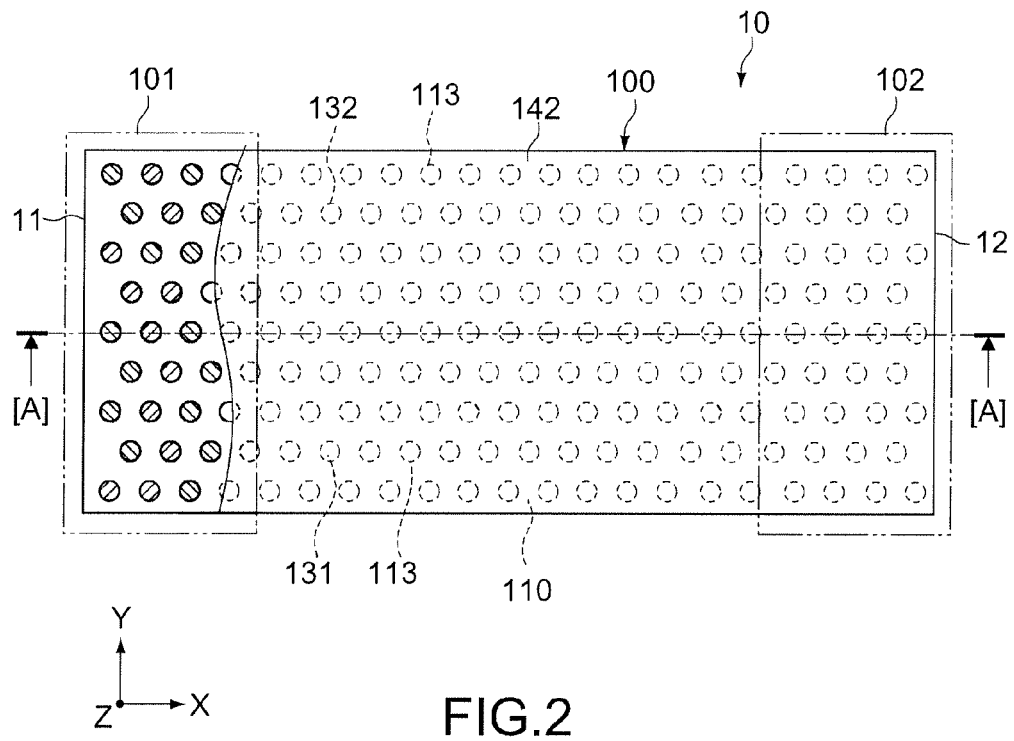
FIG. 2 is a partially cutaway plan view of the capacitor.
Figure 3:
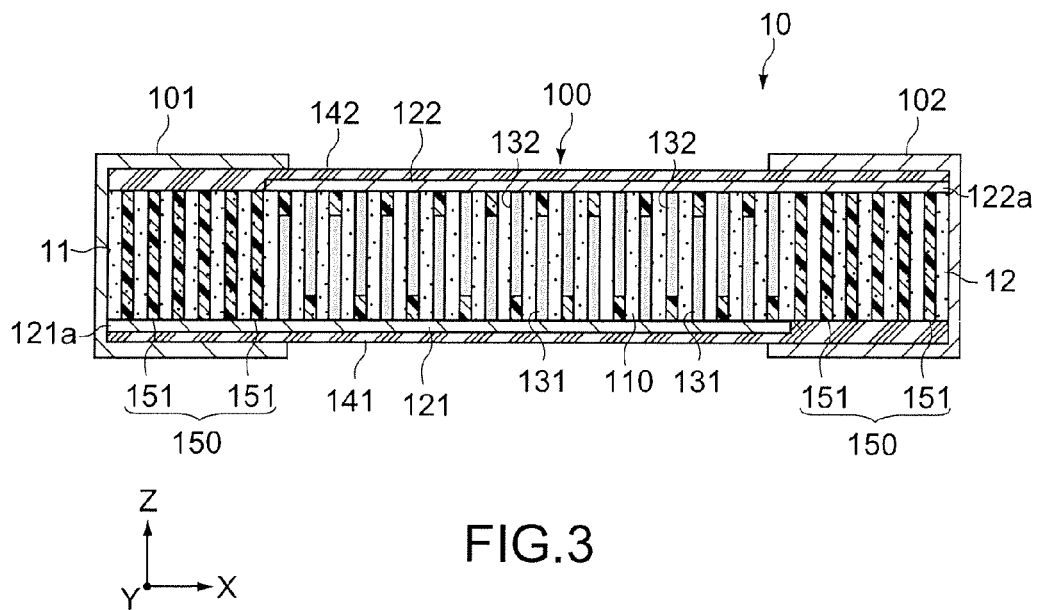
FIG. 3 is a cross-sectional view taken along the line [A]-[A] of FIG. 2.

FIGS. 1 to 3 show a configuration of a capacitor according to an embodiment of the present disclosure. FIG. 1 is a schematic overall perspective view, FIG. 2 is a partially cutaway plan view thereof, and FIG. 3 is a cross-sectional view taken along the like [A]-[A] of FIG. 2. In the figures, X-, y-, and z-axis directions represent triaxial directions orthogonal to one another.

[Entire Configuration]

A capacitor 10 according to this embodiment includes a capacitor main body 100, a first external terminal 101, and a second external terminal 102.

The capacitor main body 100 includes a dielectric layer 110, a first external electrode layer 121, a second external electrode layer 122, a plurality of first internal electrode portions 131 electrically connected to the first external electrode layer 121, and a plurality of second internal electrode portions 132 electrically connected to the second external electrode layer 122. The capacitor main body 100 further includes a first insulating protective layer 141 covering the first external electrode layer 121, and a second insulating protective layer 142 covering the second external electrode layer 122.

The first external terminal 101 is electrically connected to the first external electrode layer 121, and the first external electrode layer 121 is electrically connected to the plurality of first internal electrode portions 131. On the other hand, the second external terminal 102 is electrically connected to the second external electrode layer 122, and the second external electrode layer 122 is electrically connected to the plurality of second internal electrode portions 132.

The first and second external electrode layers 121 and 122 are arranged so as to face each other with the dielectric layer 110 disposed therebetween. The first external electrode layer 121 (first external terminal 101) is connected to, for example, a cathode, and the second external electrode layer 122 (second external terminal 102) is connected to, for example, an anode.

The first and second internal electrode portions 131 and 132 are provided in the dielectric layer 110, and are formed so as to have a substantially columnar shape extending in the thickness direction of the dielectric layer 110 (Z-axis direction). The first internal electrode portion 131 is connected to the first external electrode layer 121, and is insulated from the second external electrode layer 122. On the other hand, the second internal electrode portion 132 is connected to the second external electrode layer 122, and is insulated from the first external electrode layer 121.

In the above-mentioned configuration, since the plurality of internal electrode portions 131 and 132 are provided in the dielectric layer 110, the facing area between the first external electrode layer 121 and the second external electrode layer 122 is increased. Accordingly, it is possible to increase the capacity of the capacitor 10. In particular, because the internal electrode portions 131 and 132 have a microstructure, it is possible not only to increase the capacity but also to realize the size reduction of the element.

Figure 4:
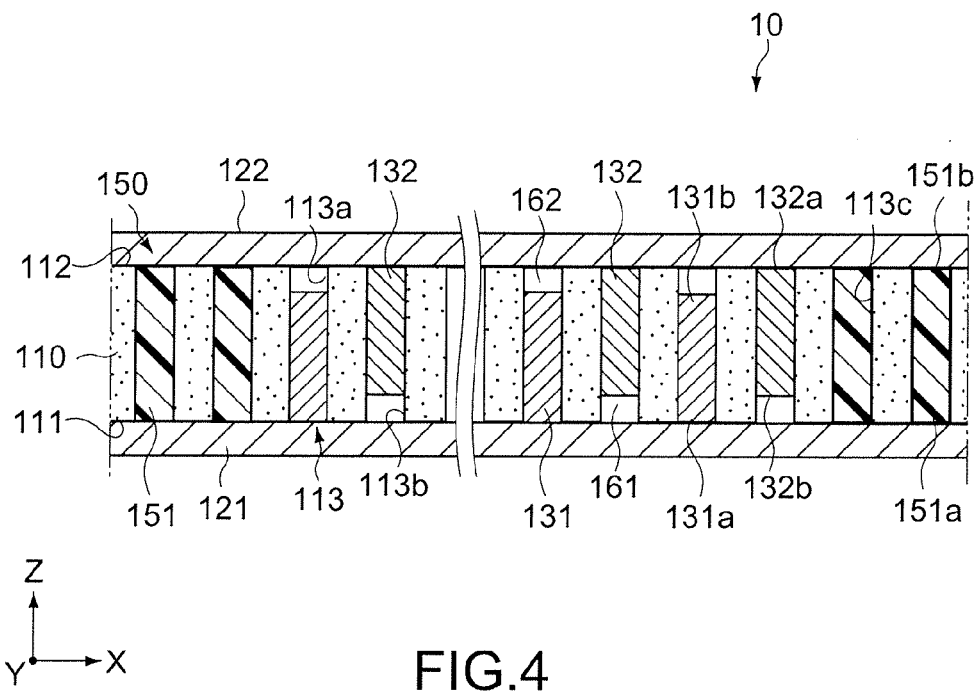
FIG. 4 is an enlarged view of a main portion of FIG. 3.

Hereinafter, the configurations of respective units of the capacitor 10 according to this embodiment will be described. FIG. 4 is an enlarged cross-sectional view of a main portion of the capacitor 10, which shows the detailed configuration of the internal electrode portions 131 and 132.

[Dielectric Layer]

The dielectric layer 110 is formed of a rectangular dielectric material having a predetermined thickness, which includes a first surface 111 (lower surface or rear surface in FIG. 4) and a second surface 112 (upper surface or front surface in FIG. 4) facing the first surface 111. On the first surface 111, the first external electrode layer 121 is arranged, and the protective layer 141 is provided so as to cover the first external electrode layer 121. On the second surface 112, the second external electrode layer 122 is arranged, and the second protective layer 142 is provided so as to cover the second external electrode layer 122.

In this embodiment, the dielectric layer 110 is formed of a valve metal oxide. Examples of the valve metal include Al, Ta, Nb, Ti, Zr, Hf, Zn, W, and Sb. In this embodiment, an Al oxide is used. The thickness is not particularly limited, and is, for example, several 100 nm to several 100 μm.

In the dielectric layer 110, a plurality of through-holes 113 are formed over the entire area of the surface of the dielectric layer 110. The plurality of through-holes 113 penetrate the dielectric layer 110 in the thickness direction of the dielectric layer 110, and communicate between the first surface 111 and the second surface 112. The plurality of through-holes 113 are regularly or irregularly formed in the first and second surfaces. In the example of FIG. 2, each of the plurality of through-holes 113 is formed in a predetermined arrangement. For example, the plurality of through-holes 113 are formed in a regular hexagonal arrangement in which the center of each through-hole 113 is located at the vertexes of regular hexagons. The shape and pore diameter of each through-hole 113 are not particularly limited. In this embodiment, each through-hole 113 is formed so as to have a substantially circle shape with an inner diameter of several 10 to several 100 nm. The distance between the adjacent through-holes 113 is also not particularly limited, and is, for example, several 10 to several 100 nm.

[External Electrode Layer]

The first external electrode layer 121 is arranged on the first surface 111 of the dielectric layer 110, and is in close contact with the first surface 111. The second external electrode layer 122 is arranged on the second surface 112 of the dielectric layer 110, and is in close contact with the second surface 112. The first external electrode layer 121 faces a first end surface 11 of the capacitor main body 100, and includes a lead end portion 121a electrically connected to the first external terminal 101. The second external electrode layer 122 faces a second end surface 12 of the capacitor main body 100, and includes a lead end portion 122a electrically connected to the second external terminal 102.

The first and second external electrode layers 121 and 122 are formed of a conductor material including a pure metal such as Cu, Ni, Cr, Ag, Pd, Fe, Sn, Pb, Pt, Ir, Rh, Ru, Al, and Ti, or an alloy thereof. The thickness of the first and second external electrode layers 121 and 122 is, for example, several 10 nm to several μm. The first and second external electrode layers 121 and 122 may be a laminated body of two or more conductor materials, and may include, for example, a Ti layer and a Cu layer laminated thereon.

The first and second external terminals 101 and 102 are provided on the first and second end surfaces 11 and 12 of the capacitor main body 100, respectively. The first and second external terminals 101 and 102 are formed of a conductive material, and are formed on the first and second end surfaces 11 and 12, respectively, by, for example, a plating method, an immersion method, or a welding method. The surfaces of the first and second external terminals 101 and 102 may be subject to solder plating as necessary.

[Internal Electrode Portion]

The first internal electrode portions 131 are arranged on a plurality of first through-hole portions 113a being a part of the plurality of through-holes 113, and are in close contact with the inner surfaces of the first through-hole portions 113a. As shown in FIG. 4, an end 131a of the first internal electrode portion 131 reaches the first surface 111 of the dielectric layer 110, and is connected to the first external electrode layer 121. The other end 131b of the first internal electrode portion 131 does not reach the second surface 112 of the dielectric layer 110, and is insulated from the second external electrode layer 122. Between the other end 131b of the first internal electrode portion 131 and the second external electrode layer 122, an insulating layer 162 including a space or formed of an insulating material is formed.

The second internal electrode portions 132 are arranged on a plurality of second through-hole portions 113b being another part of the plurality of through-holes 113, and are in close contact with the inner surfaces of the second through-hole portions 113b. As shown in FIG. 4, an end 132a of the second internal electrode portion 132 reaches the second surface 112 of the dielectric layer 110, and is connected to the second external electrode layer 122. The other end 132b of the second internal electrode portion 132 does not reach the first surface 111 of the dielectric layer 110, and is insulated from the first external electrode layer 121. Between the other end 132b of the second internal electrode portion 132 and the first external electrode layer 121, an insulating layer 161 including a space or formed of an insulating material is formed.

The first and second internal electrode portions 131 and 132 are formed of a metal material. In this embodiment, a general metal (e.g., Cu, Ni, Co, Cr, Ag, Au, Pd, Fe, Sn, Pb, and Pt), which can be plated, or an alloy thereof is used.

The arrangement position of each of the first internal electrode portion 131 and the second internal electrode portion 132 is not particularly limited. In this embodiment, as shown in FIG. 2, almost the same number of the first internal electrode portion 131 and the second internal electrode portion 132 are randomly arranged. The proportion of the first internal electrode portion 131 and the second internal electrode portion 132 is not particularly limited. However, as the number of the first internal electrode portion 131 is close to that of the second internal electrode portion 132, it is possible to more efficiently increase the capacity of an element.

[Close Contact Portion]

The capacitor 10 according to this embodiment further includes a close contact portion 150. The close contact portion 150 is provided in the third through-hole portion 113c being the remaining portion of the plurality of through-holes 113, and includes a resin material layer 151 brought into close contact with the first external electrode layer 121 and the second external electrode layer 122.

In this embodiment, the resin material layer 151 includes a plurality of resin material layers filled in the third through-hole portions 113c, which have a columnar shape. The resin material layer 151 includes a first end portion 151a connected to the first external electrode layer 121 and a second end portion 151b connected to the second external electrode layer 122, and brings the first and second external electrode layers 121 and 122 into close contact with the dielectric layer. Accordingly, it is possible to prevent the interface between the dielectric layer 110 and the external electrode layers 121 and 122 from being removed, and to prevent the element characteristics from being deteriorated.

The kind of the resin material forming the resin material layer 151 is not particularly limited. Examples of the resin material include polyimide, epoxy, acrylic, phenol, and benzocyclobutene. Because a material having high adhesiveness to metal is used as a resin material, the adhesive effect on the external electrode layers 121 and 122 is high. Moreover, because a material having high adhesiveness to the dielectric layer 110 is used as the resin material, it is possible to reduce the removal from the inner wall surface of the through-hole portion 113c.

The close contact portion 150 is formed at a plurality of positions in the surface of the capacitor 10. Because the plurality of close contact portions 150 are formed, the adhesion effect of the first and second external electrode layers 121 and 122 on the dielectric layer 110 is increased. The number of close contact portions 150 to be formed is not particularly limited. The lower limit is set depending on, for example, the adhesive strength of the first and second external electrode layers 121 and 122 on the dielectric layer 110, and the upper limit is set depending on, for example, the full capacity demanded for the capacitor 10.

The position where the close contact portion 150 is formed is not particularly limited, and the close contact portion 150 is regularly or irregularly formed in the surface of the dielectric layer 110. In this embodiment, the close contact portion 150 is provided on an outer periphery side of a capacity area in which the first and second internal electrode portions 131 and 132 are provided.

Figure 5:
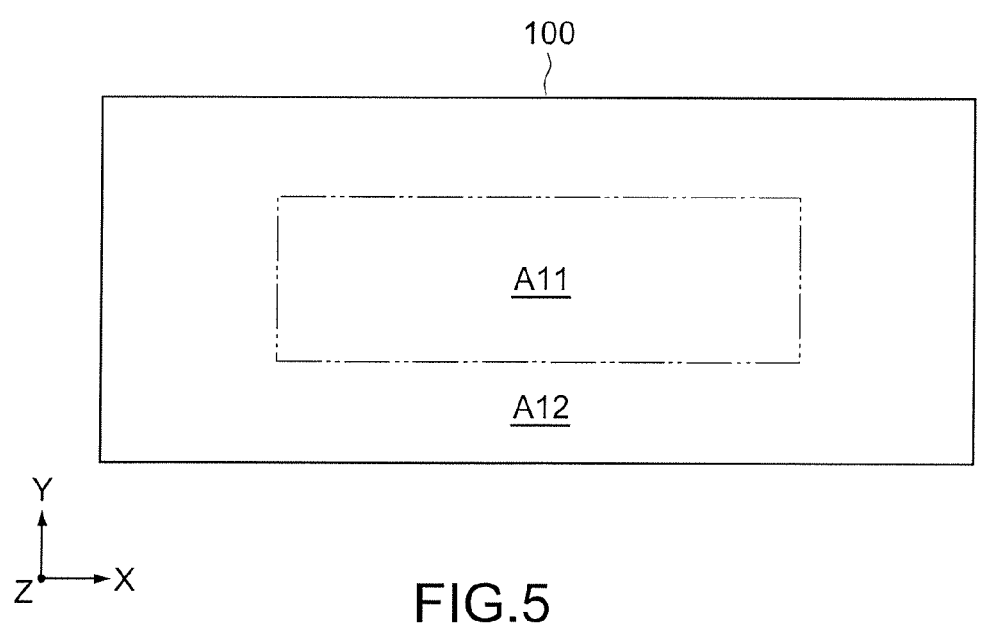
FIG. 5 is a schematic plan view showing an area configuration of the capacitor shown in FIG. 3.

FIG. 5 is a schematic view for explaining the area configuration in the surface of the capacitor main body 100. The capacitor main body 100 includes an electrode facing area A11 and a resin filling area A12.

The electrode facing area A11 is formed in a substantially rectangular area located at substantially the center of the surface of the dielectric layer 110, includes the first internal electrode portion 131 and the second internal electrode portion 132, and constitutes the capacity area in which the first and second internal electrode portions 131 and 132 face each other. The first and second through-hole portions 113a and 113b of the dielectric layer 110 correspond to the plurality of through-hole portions provided in the electrode facing area A11.

On the other hand, the resin filling area A12 is formed in an annular area having a substantially rectangular shape, which ranges from the outside of the electrode facing area A11 to the outer periphery of the dielectric layer 110, and the close contact portion 150 is provided in the resin filling area A12. The third through-hole portions 113c of the dielectric layer 110 correspond to the plurality of through-hole portions provided in the resin filling area A12.

The width of the resin filling area A12 to be formed is not particularly limited, and is, for example, not less than 1 μm and not more than 100 μm. If the width is less than 1 μm, it is hard to obtain a desired adhesion effect by the close contact portion 150. If the width is more than 100 μm, the adhesion effect by the close contact portion 150 peaks, and the area of the electrode facing area A11 is restricted, thereby making it hard to increase the capacity of the capacitor.

It should be noted that the close contact portion 150 (resin material layer 151) may be dispersively formed in the electrode facing area A11. Also in this case, in the electrode facing area A11, it is possible to improve the adhesiveness of the external electrode layers 121 and 122 on the dielectric layer 110.

The inventors of the present disclosure have produced 1000 samples (sample 1) of a capacitor in which a plurality of resin material layers having a columnar shape are formed as a close contact portion at the outer periphery (resin filling area) of an electrode facing area so as to have a width ranging from 10 to 25 μm, and 1000 samples (sample 2) of a capacitor including no close contact portion, and have evaluated whether there is removal of both of the external electrode layers by using an optical microscope with a magnification of 80×. As a result, the proportion of samples in which the removal has been detected is 0.2% in the case of the sample 1, and 2.7% in the case of the sample 2.

By the capacitor 10 according to this embodiment, the adhesive strength of the first and second external electrode layers 121 and 122 on the dielectric layer 110 is increased.

Therefore, it is possible to prevent the interface between the dielectric layer and the first and second external electrode layers 121 and 122 from being removed during handling or due to an effect of stress or the like. Accordingly, it is possible to increase the durability of the capacitor 10. Moreover, the degree of freedom in selection of a material of the dielectric layer 110 and the first and second external electrode layers 121 and 122 is increased, and materials having low mutual adhesive strength can be combined.

[Manufacturing Method]

Next, a method of manufacturing the capacitor 10 according to this embodiment will be described. FIGS. 6 to 11 are each a process cross-sectional view of a main portion for explaining the method of manufacturing the capacitor 10.

Figure 6A:
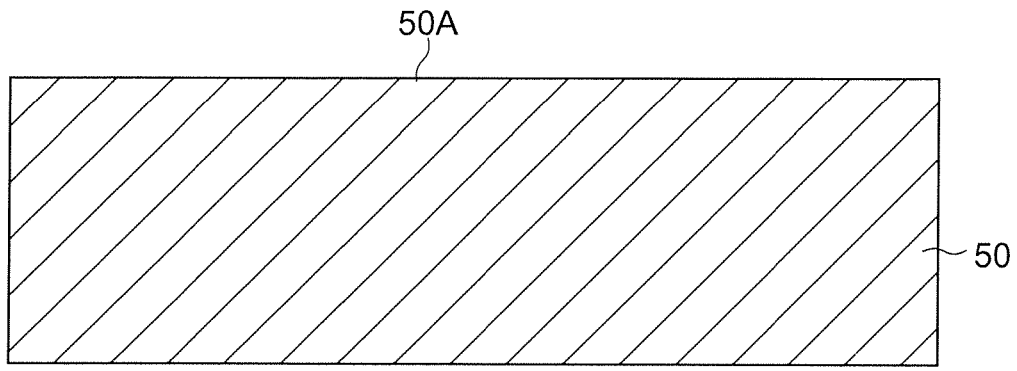
FIGS. 6A-6C are process cross-sectional views for explaining a method of manufacturing the capacitor shown in FIG. 3.
Figure 6B:
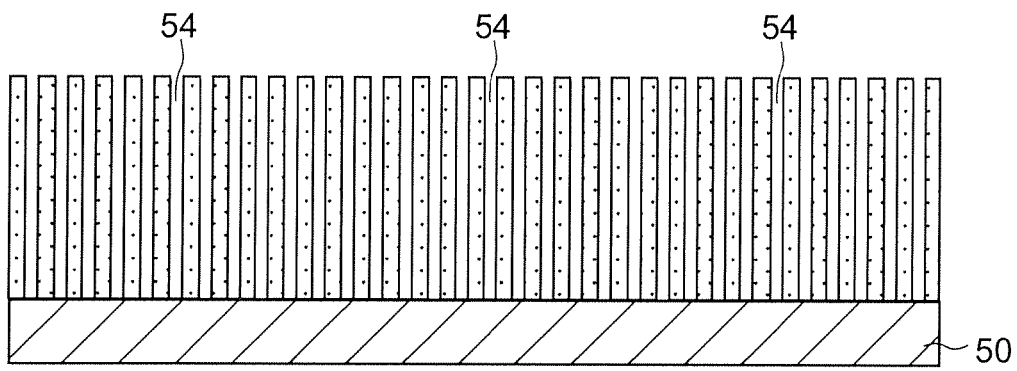

First, as shown in FIG. 6A, a base material 50 formed of valve metal is prepared, and a pit, which is a starting point of anodic oxidation, is formed on a surface 50A of the base material 50 in a hexagonal close-packed arrangement. Next, by applying voltage to the pit, the pit is subject to anodic oxidation treatment. Thus, as shown in FIG. 6B, a plurality of first holes 54 having a bottom and a desired depth (or length) are formed in the thickness direction of the base material 50.

Figure 6C:
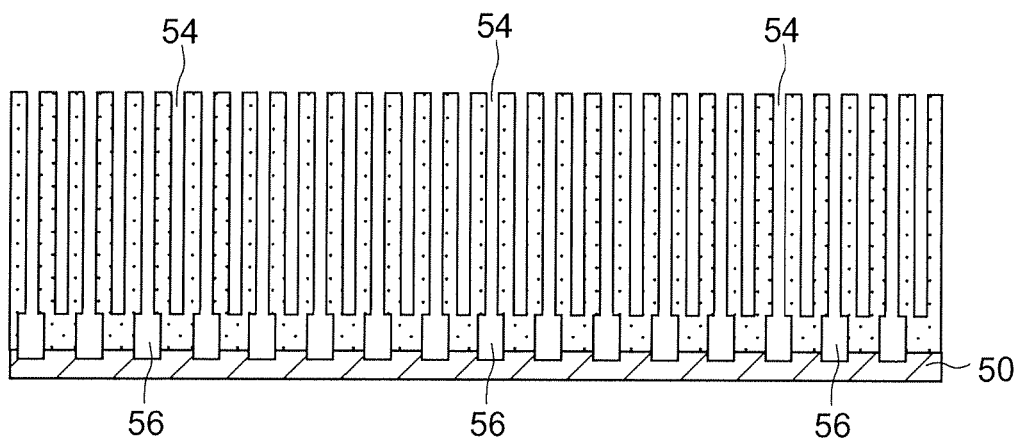
Figure 7A:
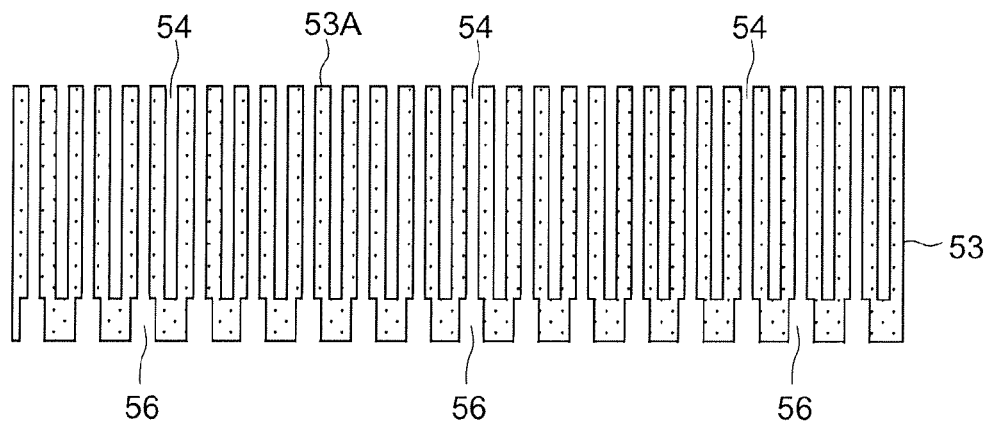
FIGS. 7A-7C are process cross-sectional views for explaining the method of manufacturing the capacitor shown in FIG. 3.

Subsequently, by applying voltage larger than that when the first holes 54 are formed, the pit is subjected to anodic oxidation treatment. Thus, as shown in FIG. 6C, a plurality of second holes 56 having a bottom are formed. After that, a bare metal portion of the base material 50 is removed by a wet etching method, thereby obtaining an oxide base material 53 having the first hole 54 and the second hole 56 as shown in FIG. 7A.

Because a pitch (distance between holes) between holes generated by the anodic oxidation is in proportion to the magnitude of voltage, the pitch between the second holes 56 subjected to large voltage is larger than that between the first holes 54, and the second hole 56 is randomly connected to a part of the first hole 54.

The conditions for the anodic oxidation treatment can be appropriately set. For example, in the anodic oxidation in the first stage shown in FIG. 6B, the applied voltage is set to several V to several 100 V, and the treatment time period is set to several minutes to several days. In the anodic oxidation in the second stage shown in FIG. 6C, the voltage value of the applied voltage is set to be several times as large as that in the first stage, and the treatment time period is set to several minutes to several ten minutes. For example, if the applied voltage in the first stage is 40 V, the first hole 54 having a diameter of approximately 100 nm can be obtained. If the applied voltage in the second stage is 80 V, the second hole 56 having a diameter of approximately 200 nm can be obtained. If the voltage value in the second stage is within the above-mentioned range, the number of first holes 54 connected to the second hole 56 is almost equivalent to the number of first holes 54 not connected to the second hole 56. Accordingly, the number of first internal electrode portions 131 formed in the first hole 54 that is connected to the second hole 56 is equivalent to the number of second internal electrode portions 132 formed in the first hole 54 that is not connected to the second hole 56. Therefore, it is possible to efficiently extract the capacitance. Moreover, if the treatment time period in the second stage is within the above-mentioned range, it is possible to reduce the thickness of the oxide base material formed in the second stage while sufficiently completing the pitch conversion of the hole. Because the oxide base material formed in the second stage is removed in the subsequent step, the thickness of the oxide base material is desirably thin as much as possible.

Figure 7B:
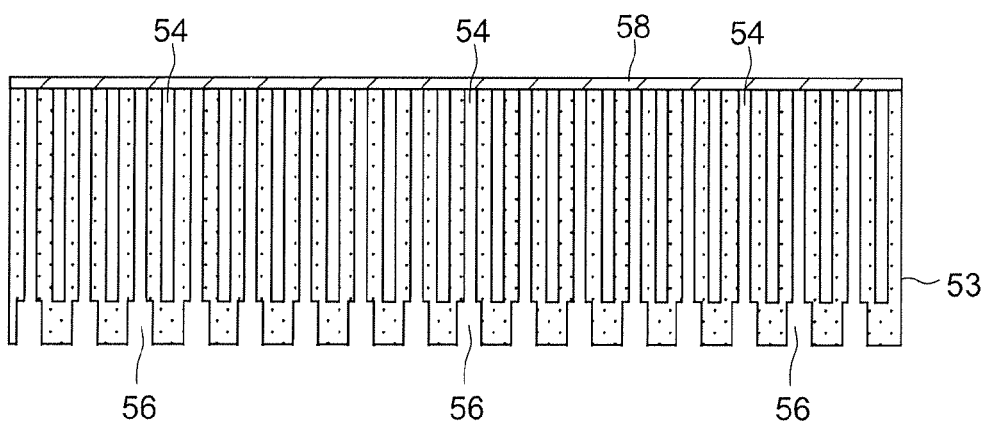

Next, as shown in FIG. 7B, a conductor layer 58 is formed on a front surface 53A of the oxide base material 53. Accordingly, the first hole 54 exposed from the front surface 53A of the oxide base material 53 is covered by the conductor layer 58. The conductor layer 58 is formed by a sputtering method, a vacuum deposition method, or the like.

Figure 7C:
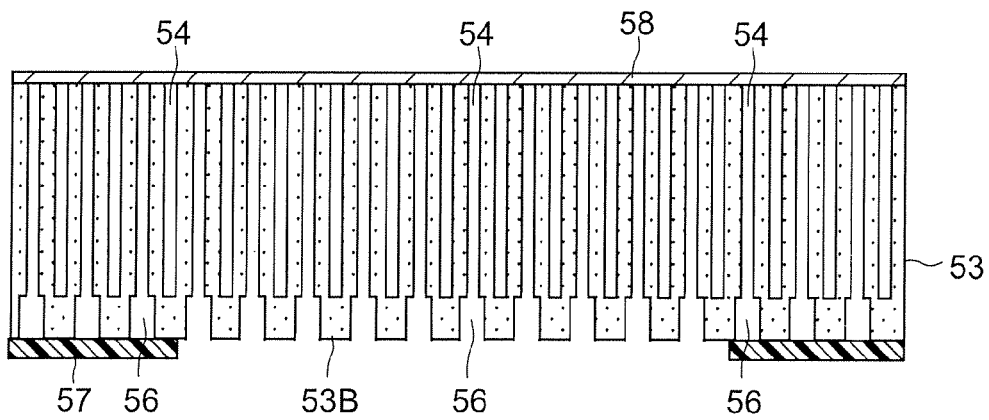

Next, as shown in FIG. 7C, a resist pattern 57 is formed on a rear surface 53B of the oxide base material 53. The resist pattern 57 is formed for forming the close contact portion 150, and is formed on an arbitrary position of the oxide base material 53 depending on the position of the formed close contact portion 150.

For forming the resist pattern 57, a screen printing method, a spray coating method, or the like can be used. For example, in the case where the close contact portion 150 is selectively formed on the periphery (resin filling area A12) of the capacitor element or the like, the resist pattern 57 is formed by the screen printing method. In the case where the close contact portion 150 is randomly formed in the surface (electrode facing area A11) of the capacitor element, the resist pattern 57 is formed by the spray coating method.

Figure 8A:
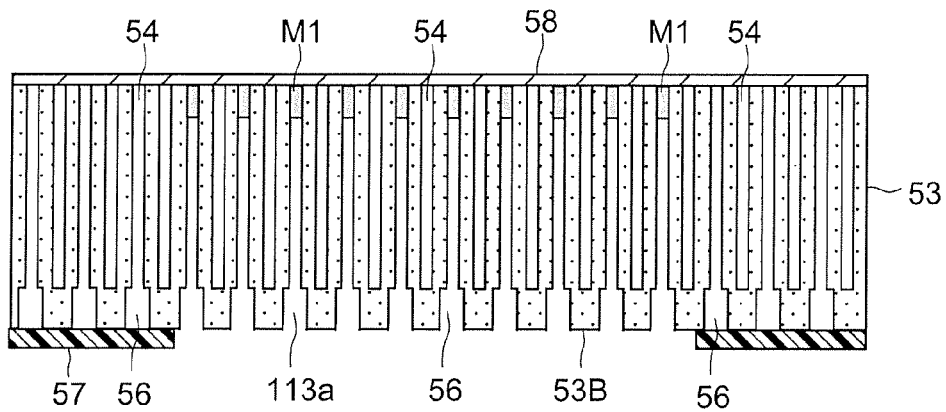
FIGS. 8A-8C are process cross-sectional views for explaining the method of manufacturing the capacitor shown in FIG. 3.

Next, as shown in FIG. 8A, by an electrolytic plating method in which the conductor layer 58 is used as a seed layer, a first plating conductor M1 having a predetermined length is formed in the first hole 54 connected to the second hole 56 whose bottom is opened (first through-hole portion 113a). At this time, because a plating solution does not enter the first hole 54 located right above the resist pattern 57, the first plating conductor M1 is not formed.

Figure 8B:
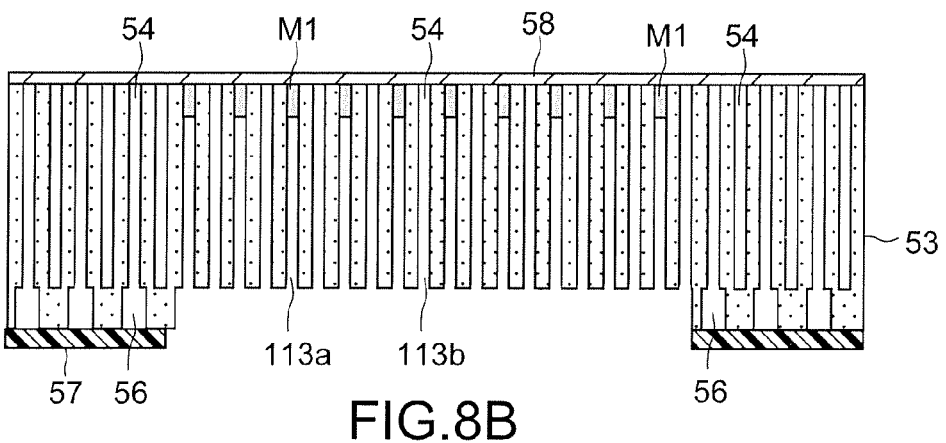
Figure 8C:
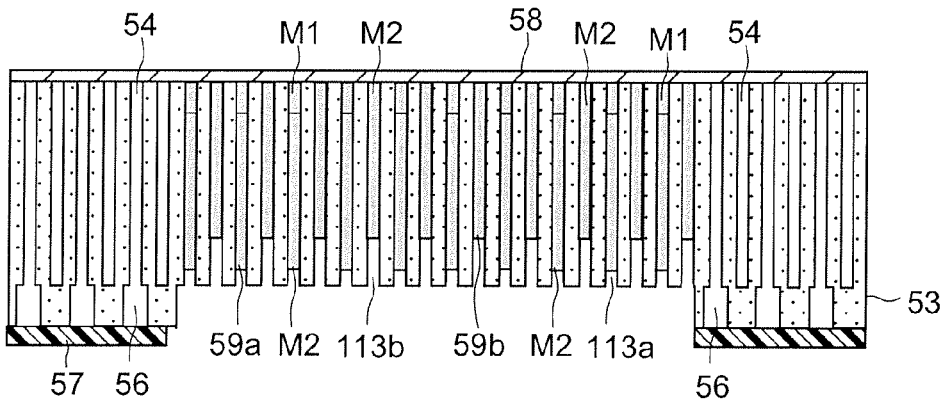

Next, the rear surface 53B of the oxide base material 53 is subject to reactive ion etching (RIE). Thus, as shown in FIG. 8B, bottoms of the first holes 54 other than that in the area where the resist pattern 57 is formed are opened. Accordingly, a second through-hole portion 113b is formed. Then, as shown in FIG. 8C, a second plating conductor M2 is formed in the first and second through-hole portions 113a and 113b by the electrolytic plating method in which the conductor layer 58 is used as a seed layer.

The length of the second plating conductor M2 is set such that the first through-hole portion 113a in which the first plating conductor M1 is formed can be filled with the plating conductor M2. Accordingly, the second plating conductor M2 is formed in the second through-hole portion 113b so as to have a length that does not exceed the depth of the second through-hole portion 113b. Thus, a cavity portion is formed. The cavity portion may be hollow, or an insulating material may be filled in the cavity portion. The thickness (height) of the cavity portion is not particularly limited, and can be set depending on the element capacitance, predetermined dielectric strength voltage between the internal and external electrodes, or the like. For example, the thickness of the cavity portion is several 10 nm to several 10 μm.

Here, a laminated conductor of the first and second plating conductors M1 and M2 constitutes a first electrode column 59a for forming the first internal electrode portion 131 later, and a single-layer conductor including only the second plating conductor M2 constitutes a second electrode column 59b for forming the second internal electrode portion 132 later. It should be noted that the first and second plating conductors M1 and M2 typically include the same kind of metal material, but may include different metal materials.

Figure 9A:
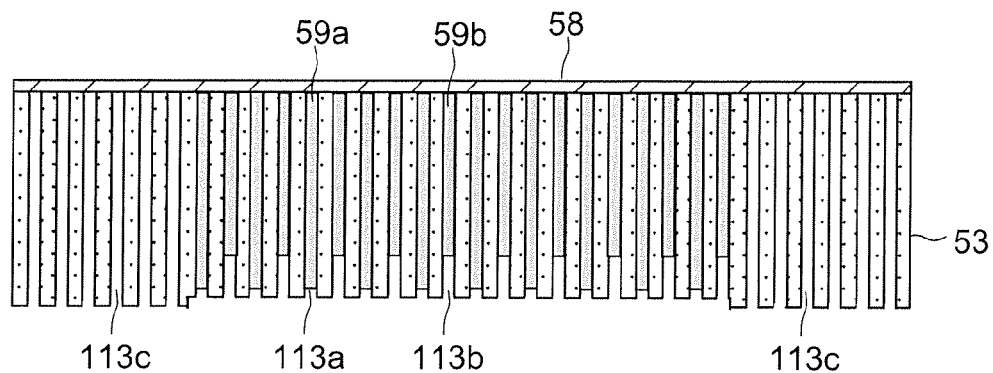
FIGS. 9A-9C are process cross-sectional views for explaining the method of manufacturing the capacitor shown in FIG. 3.

Next, as shown in FIG. 9A, the rear surface of the oxide base material 53 is polished. As the polishing treatment, for example, a chemical mechanical polishing (CMP) method is used. Accordingly, the bottom of the first hole 54 located right above the resist pattern 57 is opened, and a third hollow through-hole portion 113c in which the plating conductors M1 and M2 are not formed is formed.

Figure 9B:
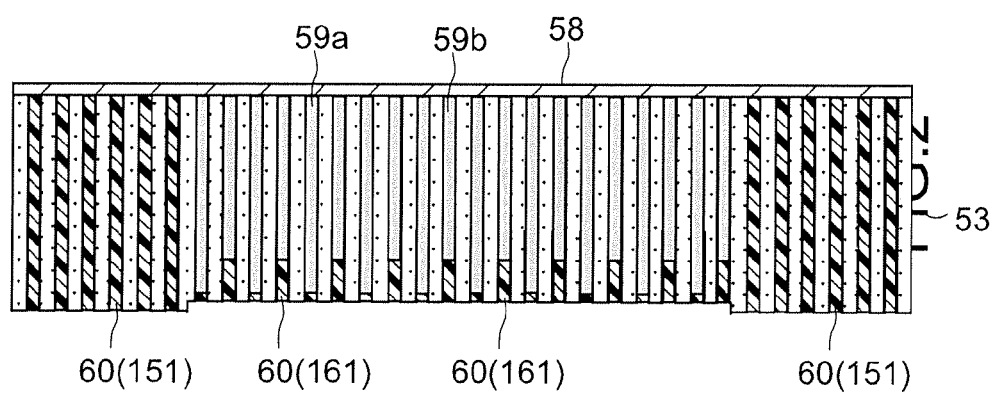

Next, as shown in FIG. 9B, by filling a resin material 60 in the third through-hole portion 113c, a plurality of resin material layers 151 having a columnar shape are formed. Examples of the resin material include an insulating resin material such as polyimide, epoxy, acrylic, phenol, and benzocyclobutene. The method of filling the resin material 60 in the third through-hole portion 113c is not particularly limited, and an appropriate method such as a photolithography technique, a screen printing technique, and a nano-imprinting technique can be used.

In this embodiment, the resin material 60 is formed not only in the third through-hole portion 113c but also in the cavity portions of the first and second through-hole portions 113a and 113b in which electrode columns 59a and 59b are formed. Here, The resin material 60 filled in the cavity portion of the second through-hole portion 113b constitutes the insulating layer 161 ensuring the insulation between the second internal electrode portion 132 and the first external electrode layer 121.

It should be noted that in the cavity portion, the resin material 60 may not be filled, or another insulating material may be filled. Examples of the other insulating material include valve metal oxide as in the case of the oxide base material 53, an electrodepositable resin material (e.g., polyimide, epoxy, acrylic), and $SiO_2$.

Figure 9C:
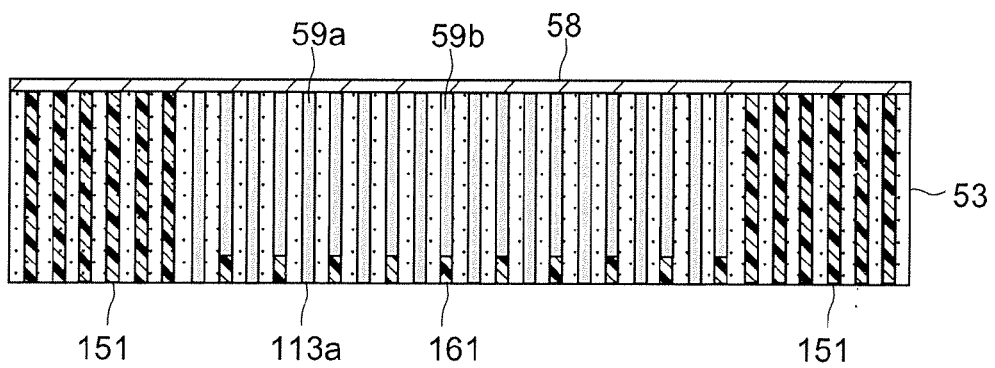

Next, as shown in FIG. 9C, the rear surface of the oxide base material 53 is polished again. As the polishing treatment, for example, a CMP method is used. Accordingly, the rear surface of the oxide base material 53 is planarized, and the resin material 60 filled in the first through-hole portion 113a is removed. Thus, the first electrode column 59a is exposed from the rear surface of the oxide base material 53. The planarized oxide base material 53 constitutes the dielectric layer 110 of the capacitor 10.

Figure 10A:
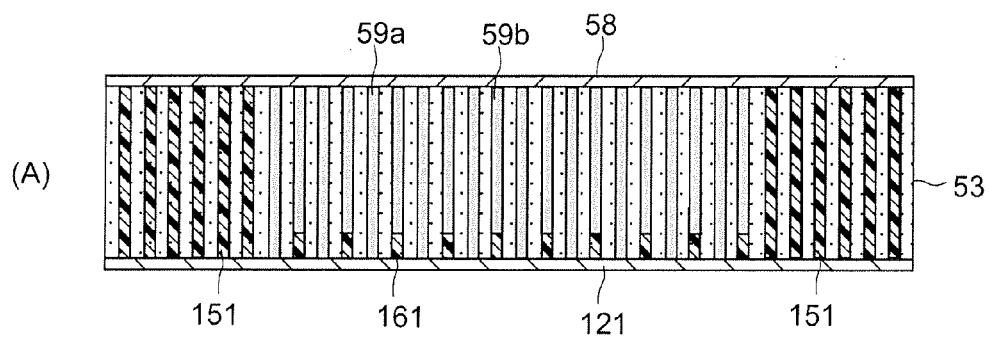
FIGS. 10A-10C are process cross-sectional views for explaining the method of manufacturing the capacitor shown in FIG. 3.

Next, as shown in FIG. 10A, the first external electrode layer 121 is formed on the rear surface of the oxide base material 53. The first external electrode layer 121 is formed by, for example, a method in which deposition is performed in a negative pressure atmosphere, such as a sputtering method and a deposition method. By using such a method, the first external electrode layer 121 having high adhesiveness to the oxide base material 53 can be deposited. In particular, because a large amount of energy is used in the sputtering method, it is possible to achieve higher adhesiveness. The first external electrode layer 121 is formed so as to have a sufficient thickness (e.g., more than twice the pore size of the through-hole 113) to hermetically seal the through-hole 113. The negative pressure atmosphere when the first external electrode layer 121 is formed may be, for example, not more than 10 Pa (pascal).

Figure 10B:
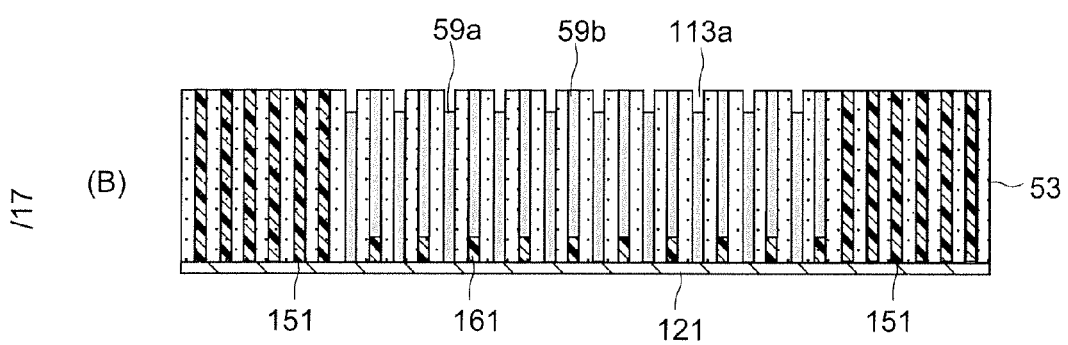

After that, as shown in FIG. 10B, the conductor layer 58 on the surface of the oxide base material 53 is removed. The method of removing the conductor layer 58 is not particularly limited, and a wet etching method, a dry etching method, an ion milling method, a CMP method or the like can be used.

Then, the first electrode column 59a is removed by only a predetermined depth by an electrolytic etching method in which the first external electrode layer 121 is used as a seed layer. Accordingly, a cavity portion having a predetermined depth is formed between the tip of the first electrode column 59a and the surface of the oxide base material 53. The cavity portion may be hollow as it is, or may be filled with an insulating material. The thickness (height) of the cavity portion is not particularly limited, and can be set depending on the element capacitance, predetermined dielectric strength voltage between the internal and external electrodes, or the like. For example, the thickness of the cavity portion is several 10 nm to several 10 μm.

Figure 10C:
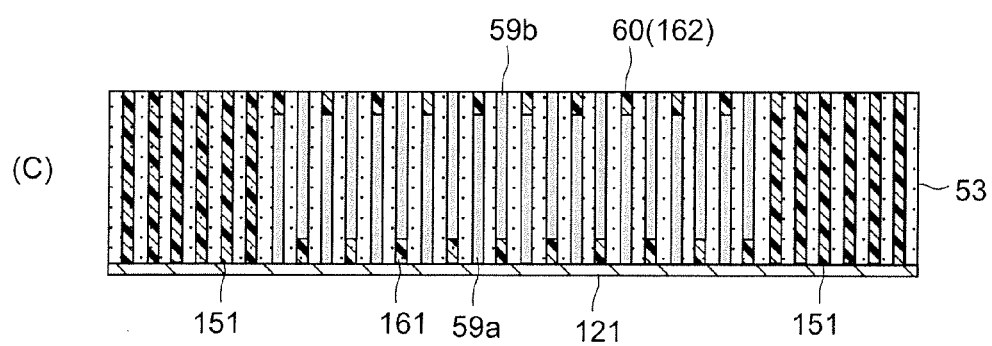

Next, as shown in FIG. 10C, the resin material 60 is filled in the cavity portion formed in the upper portion of the first through-hole portion 113a. Examples of the resin material 60 include an insulating resin material such as polyimide, epoxy, acrylic, phenol, and benzocyclobutene. The method of filling the resin material 60 in the first through-hole 113a is not particularly limited, and an appropriate method such as a photolithography technique, a screen printing technique, and a nano-imprinting technique can be used. The resin material 60 filled in the cavity portion of the first through-hole portion 113a constitutes the insulating layer 162 ensuring the insulation between the first internal electrode portion 131 and the second external electrode layer 122.

It should be noted that in the cavity portion, the resin material 60 may not be filled, or another insulating material may be filled. Examples of the other insulating material include valve metal oxide as in the case of the oxide base material 53, an electrodepositable resin material (e.g., polyimide, epoxy, acrylic), and $SiO_2$.

Figure 11A:
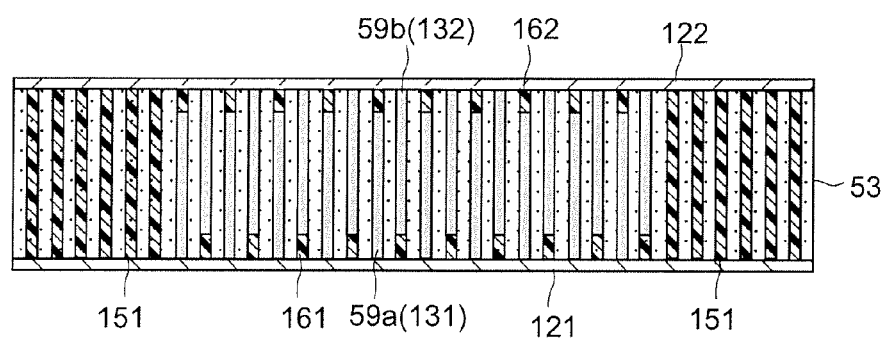
FIGS. 11A and 11B are process cross-sectional views for explaining the method of manufacturing the capacitor shown in FIG. 3.

Next, as shown in FIG. 11A, the second external electrode layer 122 is formed on the surface of the oxide base material 53. The second external electrode layer 122 is formed by, for example, a method in which deposition is performed in a negative pressure atmosphere, such as a sputtering method and a deposition method. By using such a method, the second external electrode layer 122 having high adhesiveness to the oxide base material 53 can be deposited. In particular, because a large amount of energy is used in the sputtering method, it is possible to achieve higher adhesiveness. The second external electrode layer 122 is formed so as to have a sufficient thickness (e.g., more than twice the pore size of the through-hole 113) to hermetically seal the through-hole 113. The negative pressure atmosphere when the second external electrode layer 122 is formed may be, for example, not more than 10 Pa (pascal).

Figure 11B:
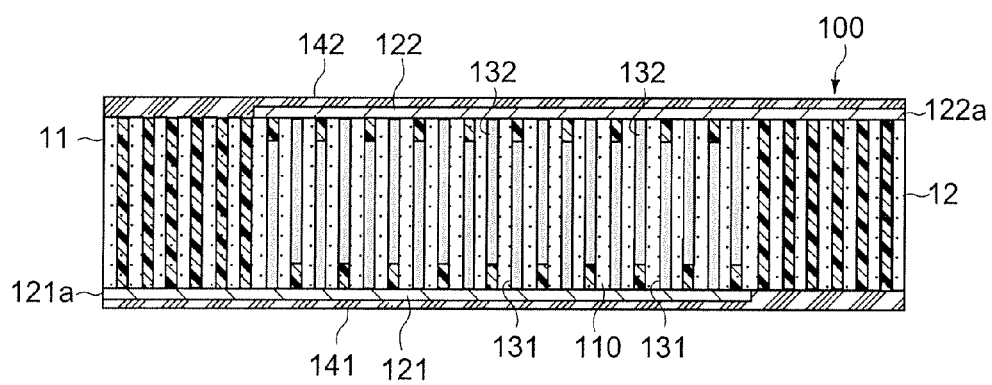

Then, as shown in FIG. 11B, the first and second external electrode layers 121 and 122 are patterned to the respective predetermined shapes, and the first and second protective layers 141 and 142 are formed so as to cover the first and second external electrode layers 121 and 122.

Figure 12:
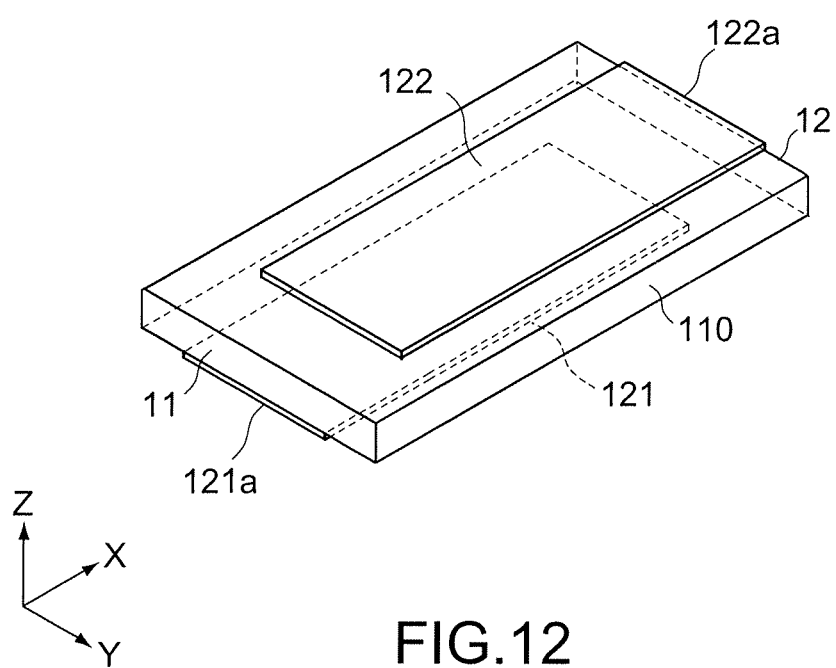
FIG. 12 is a perspective view for explaining shapes of first and second external electrode layers of the capacitor shown in FIG. 3.

FIG. 12 is a perspective view showing the pattern shapes of the first and second external electrode layers 121 and 122. The first and second external electrode layers 121 and 122 are formed so as to have a strip shape having a width narrower than the dielectric layer 110. The lead end portion 121a of the first external electrode layer 121 extends to the first end surface 11, and the lead end portion 122a of the second external electrode layer 122 extends to the second end surface 12. The electrode facing area A11 of the capacitor main body 100 is formed in an area in which the first external electrode layer 121 and the second external electrode layer 122 face each other.

The first and second external electrode layers 121 and 122 are patterned by using a known photolithography technique. The etching method may be a dry etching method or a wet etching method.

The material of the first and second protective layers 141 and 142 is not particularly limited as long as it is an insulating material. Examples of the material include valve metal oxide as in the case of the oxide base material 53, an electrodepositable resin material (e.g., polyimide, epoxy, acrylic), and $SiO_2$. Also the method of forming the protective layers 141 and 142 is not particularly limited, and an appropriate deposition method such as a spin coating method, an electrodeposition method, a sputtering method, and a chemical vapor deposition (CVD) method can be used.

After that, the first and second external terminals 101 and 102 are formed on the first and second end surfaces 11 and 12 of the capacitor main body 100. Thus, the capacitor 10 according to this embodiment is produced. The capacitor 10 may be individually produced. Alternatively, after a plurality of capacitors are produced with the same base material at the same time, the plurality of capacitors may be divided by dicing or the like. In this case, the first and second external terminals are formed on the individual element thus divided.

Second Embodiment

Figure 13:
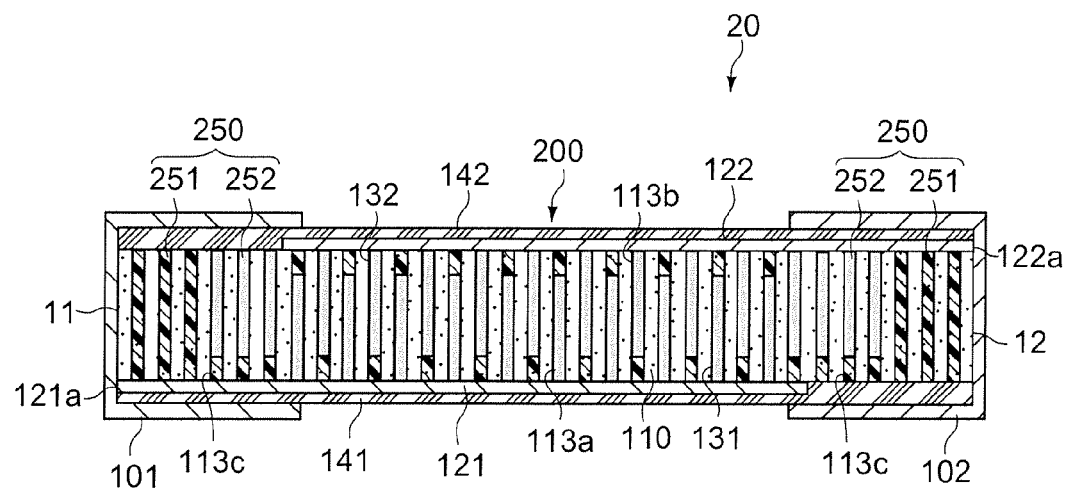
FIG. 13 is a cross-sectional side view showing a schematic configuration of a capacitor according to a second embodiment of the present disclosure.

FIG. 13 is a schematic cross-sectional view showing a configuration of a capacitor according to a second embodiment of the present disclosure. Hereinafter, a configuration different from that in the first embodiment will be mainly described. The same configuration as that of the first embodiment will be denoted by the same reference symbols and a description thereof will be omitted or simplified.

A capacitor 20 according to this embodiment includes a capacitor main body 200, the first external terminal 101, and the second external terminal 102.

The capacitor main body 200 includes the dielectric layer 110, the first external electrode layer 121, the second external electrode layer 122, the plurality of first internal electrode portions 131, the plurality of second internal electrode portions 132, the first protective layer 141, and the second protective layer 142. Because those components have the same configurations as those of the first embodiment, the description thereof will be omitted.

The capacitor main body 200 according to this embodiment further includes a close contact portion 250. The close contact portion 250 is provided in the third through-hole portion 113c, and brings the first external electrode layer 121 into close contact with the second external electrode layer 122.

Figure 14:
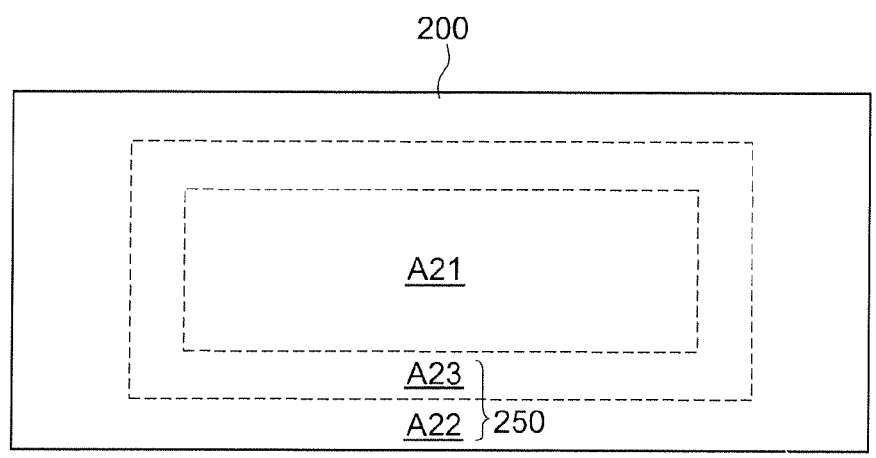
FIG. 14 is schematic plan view showing an area configuration of the capacitor shown in FIG. 13.

The close contact portion 250 includes a plurality of resin material layers 251 having a columnar shape and a plurality of metal material layers 252 having a columnar shape. FIG. 14 is a schematic diagram for explaining the area configuration in the surface of the capacitor main body 200. The capacitor main body 200 includes an electrode facing area A21 (first area), a resin filling area A22 (second area), and a metal layer forming area A23 (third area). The resin filling area A22 and the metal layer forming area A23 constitute the close contact portion 250.

The electrode facing area A21 is formed in a substantially rectangular area located at substantially the center of the surface of the dielectric layer 110, includes the first internal electrode portion 131 and the second internal electrode portion 132, and constitutes the capacity area in which the first and second internal electrode portions 131 and 132 face each other. The first and second through-hole portions 113a and 113b of the dielectric layer 110 correspond to the plurality of through-hole portion provided in the electrode facing area A11.

The resin filling area A22 is formed in an annular area having a substantially rectangular shape, which ranges from the outside of the electrode facing area A21 to the outer periphery of the dielectric layer 110. The plurality of resin material layers 251 are provided in the third through-hole portion 113c in the resin filling area A22, and both ends of each of the plurality of resin material layers 251 are connected to the first and second external electrode layers 121 and 122.

The metal layer forming area A23 is formed in an annular area having a substantially rectangular shape between the electrode facing area A21 and the resin filling area A22. The plurality of metal material layers 252 are provided in the third through-hole portion 113c in the metal layer forming area A23. One end of the metal material layer 252 is connected to the external electrode layer 122, and the other end of the metal material layer 252 is insulated from the first external electrode layer 121.

In this embodiment, because the close contact portion 250 has a composite configuration including the resin material layer 251 and the metal material layer 252, it is possible to increase the adhesive effect of the first and second external electrode layers 121 and 122 on the dielectric layer 110.

Specifically, because the junction between the metal material layer 252 and the second external electrode layer 122 is connection between metals, it is possible to improve the adhesiveness between the dielectric layer 110 and the second external electrode layer 122. Moreover, because the resin filling area A22 is formed on an outer periphery side of the metal layer forming area A23, the adhesiveness between the dielectric layer 110 and the first and second external electrode layers 121 and 122 is increased on the outermost periphery of the dielectric layer 110, and it is possible to effectively prevent the delamination of these layers.

The resin material layer 251 is configured in the same way as that of the resin material layer 151 according to the first embodiment, and is formed of, for example, an insulating resin material such as polyimide, epoxy, acrylic, phenol, and benzocyclobutene. The metal material layer 252 is typically formed of the same kind of metal material as that of the first and second internal electrode portions 131 and 132, but is of course not limited thereto.

The width of the resin filling area A22 to be formed is not particularly limited, and is, for example, not less than 1 μm and not more than 100 μm. If the width is less than 1 μm, it is hard to obtain a desired adhesion effect by the resin material layer 251. If the width is more than 100 μm, the adhesion effect by the resin material layer 251 peaks.

The width of the metal layer forming area A23 to be formed is not particularly limited, and is, for example, not less than 0.1 μm and not more than 1.0 μm. If the width is less than 0.1 μm, it is hard to obtain a desired adhesion effect by the metal material layer 252. If the width is more than 1.0 μm, the dielectric layer 110 is easily cracked due to stress biased in one direction, which is caused from the external electrode layer.

The present inventors have produced 1000 samples of a capacitor in which a plurality of a metal material layers having a columnar shape are formed as a close contact portion at the outer periphery (metal layer forming area) of an electrode facing area so as to have a width ranging from 0.5 to 0.8 μm, and a plurality of resin material layers having a columnar shape, which is made of polyimide, at the outer periphery (resin filling area) of the metal layer forming area so as to have a width ranging from 10 to 25 μm, and have evaluated whether there is removal of both of the external electrode layers by using an optical microscope with a magnification of 80×. As a result, the proportion of samples in which the removal has been detected is 0%.

By the capacitor 20 according to this embodiment, the adhesive strength of the first and second external electrode layers 121 and 122 on the dielectric layer 110 is increased. Therefore, it is possible to prevent the interface between the dielectric layer and the first and second external electrode layers 121 and 122 from being removed during handling or due to an effect of stress or the like. Accordingly, it is possible to increase the durability of the capacitor 20. Moreover, the degree of freedom in selection of a material of the dielectric layer 110 and the first and second external electrode layers 121 and 122 is increased, and materials having low mutual adhesive strength can be combined.

[Manufacturing Method]

Next, a method of manufacturing the capacitor 20 according to this embodiment will be described. FIGS. 15 and 16 are process cross-sectional views of a main portion for explaining the method of manufacturing the capacitor 20. Here, because processes up to the process shown in FIG. 15 are the same as those in the first embodiment (see FIGS. 6A to C, FIGS. 7A to C, and FIG. 8A), the description thereof will be omitted. It should be noted that in other same processes as those in the first embodiment, a specific method, dimension, material, and the like are the same as those described in the first embodiment. Therefore, the description thereof will be omitted.

Figure 15A:
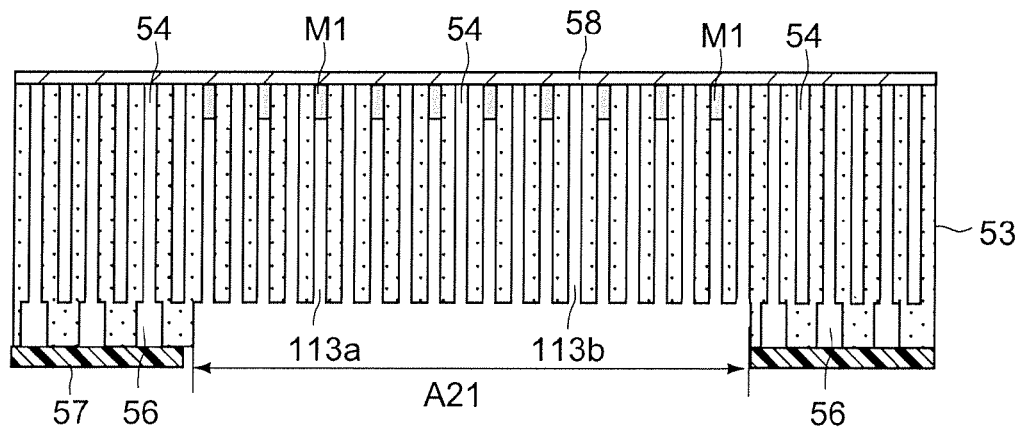
FIGS. 15A-15C are process cross-sectional views for explaining a method of manufacturing the capacitor shown in FIG. 13.
Figure 15B:
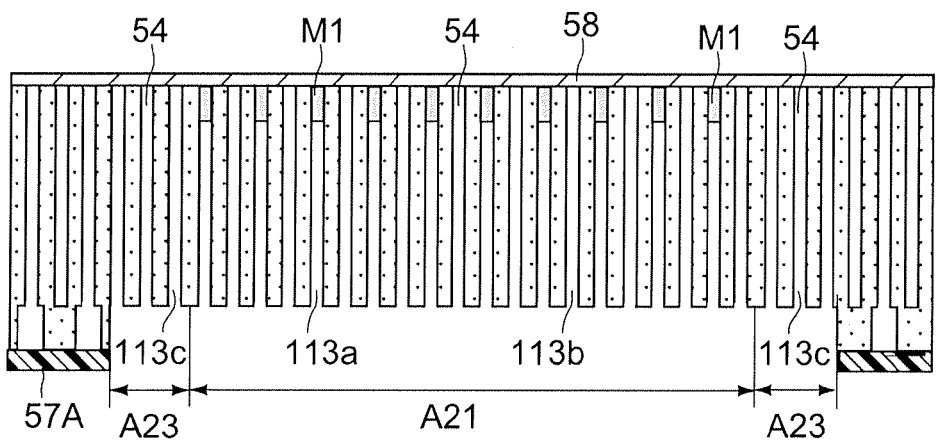

As shown in FIG. 15A, after the first plating conductor M1 is formed in the electrode facing area A21 partitioned by the resist pattern 57, as shown in FIG. 15B, a resist pattern 57A having a lager opening than that of the resist pattern 57 is formed on the rear surface of the oxide base material 53. Then, the rear surface of the oxide base material 53 is etched (subject to RIE) using the resist pattern 57A as a mask. Accordingly, the metal layer forming area A23 is formed around the electrode facing area A21.

Figure 15C:
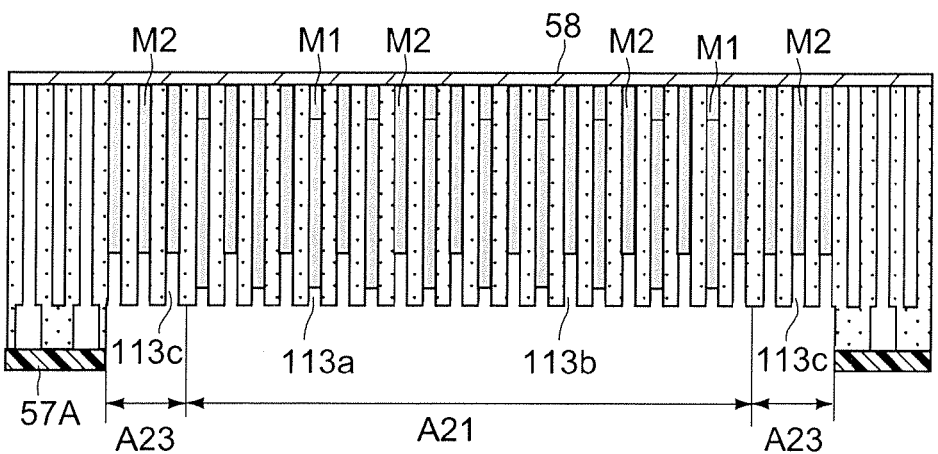

Then, as shown in FIG. 15C, the second plating conductor M2 is formed on the first and second through-hole portions 113a and 113b in the electrode facing area A21 and on the third through-hole portion 113c in the metal layer forming area A23 again by an electrolytic plating method in which the conductor layer 58 is used as a seed layer. The second plating conductor M2 formed on the third through-hole portion 113c constitutes the metal material layer 252 having a columnar shape provided in the metal layer forming area A23.

Figure 16A:
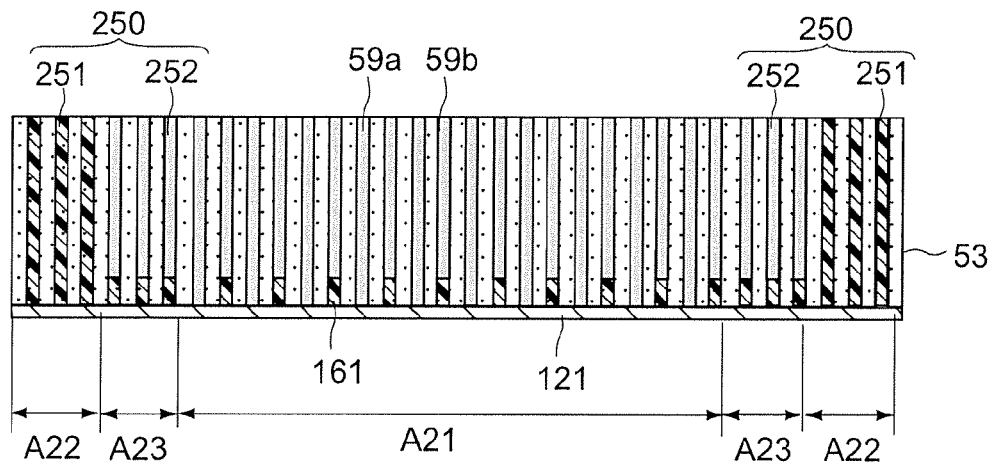
FIGS. 16A and 16B are process cross-sectional views for explaining the method of manufacturing the capacitor shown in FIG. 13.

After that, by performing the same processes as those in the first embodiment (FIGS. 9A to C, FIG. 10A), as shown in FIG. 16A, the plurality of resin material layers 251 having a columnar shape are formed around the metal layer forming area A23. The resin material layer 251 is provided in the resin filling area A22 surrounding the metal layer forming area A23. Moreover, by using the resin material forming the resin material layer 251, the insulating layer 161 made of resin is formed between the metal material layer 252 and the first external electrode layer 121, and between the second electrode column 59b and the first external electrode layer 121.

Figure 16B:
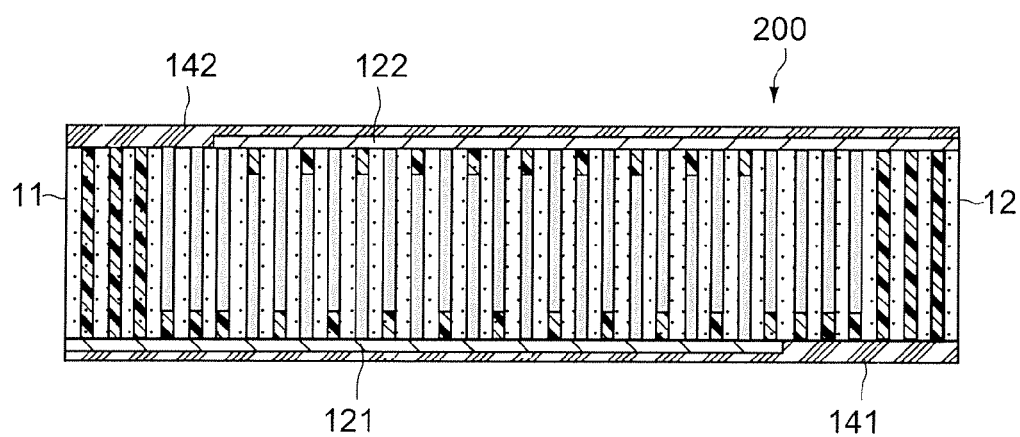

Next, as is the case with the first embodiment, the second external electrode layer 122, and the first and second protective layers 141 and 142 are formed. Thus, as shown in FIG. 16B, the capacitor main body 200 is produced. After that, the first and second external terminals 101 and 102 are formed on the first and second end surfaces 11 and 12 of the capacitor main body 200, respectively, thereby producing the capacitor 20 according to this embodiment.

Third Embodiment

Figure 17:
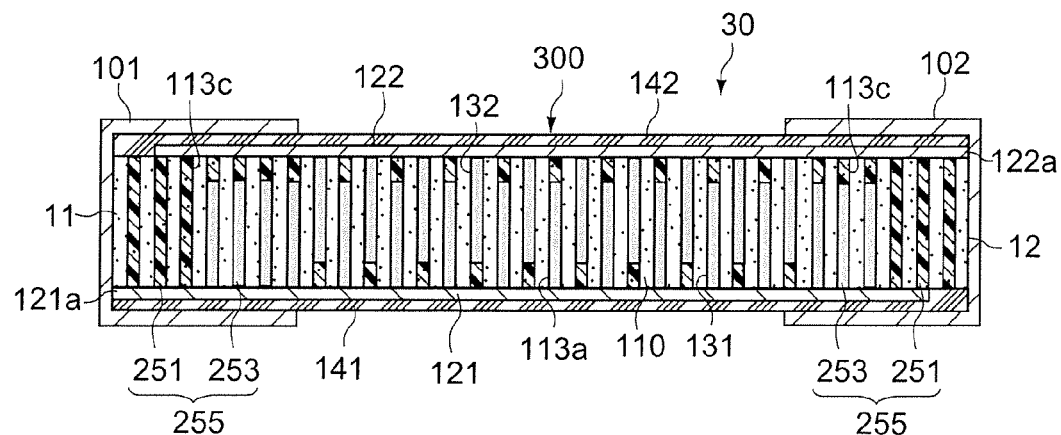
FIG. 17 is a cross-sectional side view showing a schematic configuration of a capacitor according to a third embodiment of the present disclosure.

FIG. 17 is a schematic cross-sectional view showing a configuration of a capacitor according to a third embodiment of the present disclosure. Hereinafter, a configuration different from that in the first embodiment and the second embodiment will be mainly described. The same configuration as that of the embodiments will be denoted by the same reference symbols and a description thereof will be omitted or simplified.

A capacitor 30 according to this embodiment includes a capacitor main body 300, the first external terminal 101, and the second external terminal 102.

The capacitor main body 300 includes the dielectric layer 110, the first external electrode layer 121, the second external electrode layer 122, the plurality of first internal electrode portions 131, the plurality of second internal electrode portions 132, the first protective layer 141, and the second protective layer 142. Because those components have the same configurations as those of the first embodiment, the description thereof will be omitted.

The capacitor main body 300 according to this embodiment further includes a close contact portion 255. The close contact portion 255 is provided in the third through-hole portion 113c, and brings the first external electrode layer 121 into close contact with the second external electrode layer 122.

The close contact portion 255 includes the plurality of resin material layers 251 having a columnar shape and a plurality of metal material layers 253 having a columnar shape. This embodiment differs from the second embodiment in that the metal layer forming area A23 of the capacitor main body (See FIG. 14) includes the metal material layer 253. Specifically, in this embodiment, the plurality of metal material layer 253 are provided on the third through-hole portion 113c in the metal layer forming area A23. One end the metal material layer 253 is connected to the first external electrode layer 121, and the other end of the metal material layer 253 is insulated from the second external electrode layer 122.

In this embodiment, because the close contact portion 255 has a composite configuration including the resin material layer 251 and the metal material layer 253, it is possible to increase the adhesive effect of the first and second external electrode layers 121 and 122 on the dielectric layer 110. In particular, according to this embodiment, because metal junction is formed between the metal material layer 253 and the first external electrode layer 121, the adhesiveness between them is increased. Accordingly, it is possible to increase the peel strength between the first external electrode layer 121 and the dielectric layer 110.

The width of the metal layer forming area A23 in which the metal material layer 253 is formed is not particularly limited, and is, for example, not less than 0.1 µm and not more than 1.0 µm. If the width is less than 0.1 µm, it is hard to obtain a desired adhesion effect by the metal material layer 252. If the width is more than 1.0 µm, the dielectric layer 110 is easily cracked due to stress biased in one direction, which is caused from the external electrode layer.

By the capacitor 30 according to this embodiment, the adhesive strength of the first and second external electrode layers 121 and 122 on the dielectric layer 110 is increased. Therefore, it is possible to prevent the interface between the dielectric layer and the first and second external electrode layers 121 and 122 from being removed during handling or due to an effect of stress or the like. Accordingly, it is possible to increase the durability of the capacitor 30. Moreover, the degree of freedom in selection of a material of the dielectric layer 110 and the first and second external electrode layers 121 and 122 is increased, and materials having low mutual adhesive strength can be combined.

[Manufacturing Method]

Figure 18:
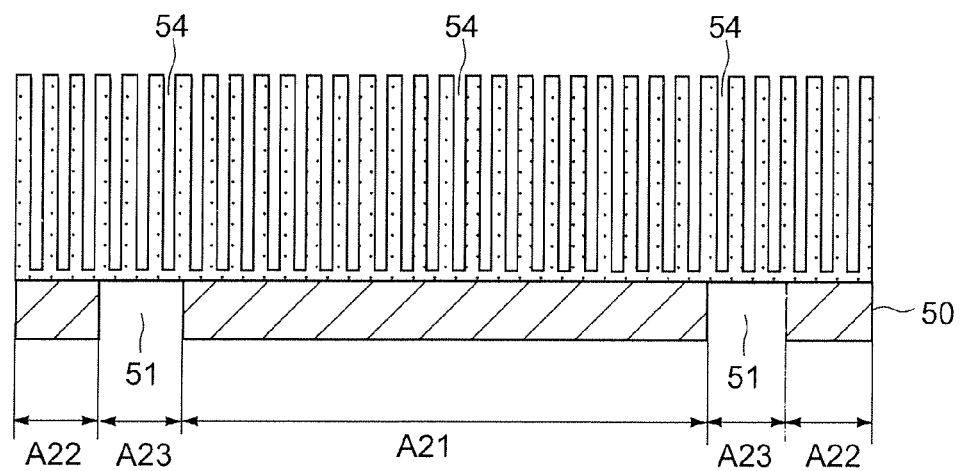
FIG. 18 is a process cross-sectional view for explaining a method of manufacturing the capacitor shown in FIG. 17.

Next, a method of manufacturing the capacitor 30 according to this embodiment will be described. FIGS. 18 and 19 are process cross-sectional views of a main portion for explaining the method of manufacturing the capacitor 30. Here, because processes up to the process shown in FIG. 18 are the same as those in the first embodiment (see FIGS. 6A and B), the description thereof will be omitted.

As shown in FIG. 18, after the plurality of first holes 54 having a predetermined depth are formed on the surface of the metal base material 50, an opening 51, which has a shape corresponding to the shape of the metal layer forming area A23, is formed on the rear surface of the metal base material 50. For forming the opening 51, a wet etching method, a dry etching method, or the like is used. The opening 51 is formed so as to have a depth such that the metal base material 50 in the area can be removed.

Figure 19A:
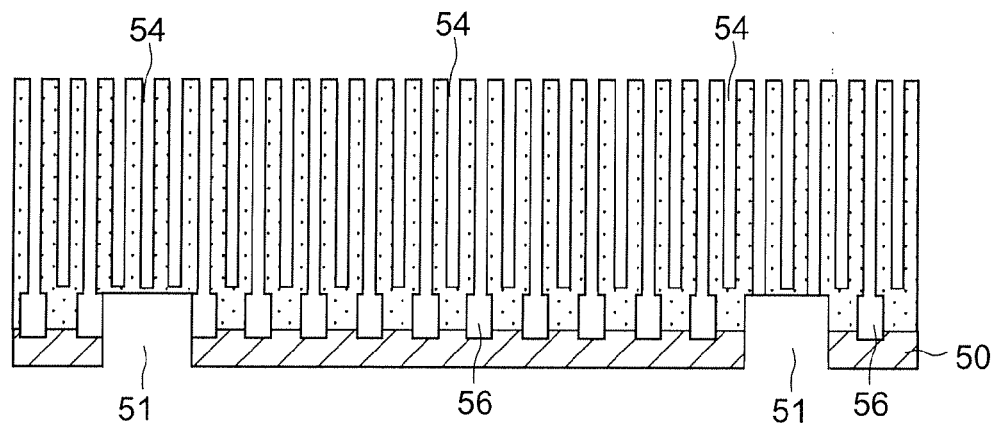
FIGS. 19A-19C are process cross-sectional views for explaining the method of manufacturing the capacitor shown in FIG. 17.

After that, the metal base material 50 is subject to the anodic oxidation treatment in the second stage. Thus, as shown in FIG. 19A, the plurality of second holes 56 having a pitch wider than that of the first hole 54 are formed. At this time, because there is no metal base material 50 in the area in which the opening 51 is formed, the second hole 56 is not formed in the area in which the opening 51 is formed.

Figure 19B:
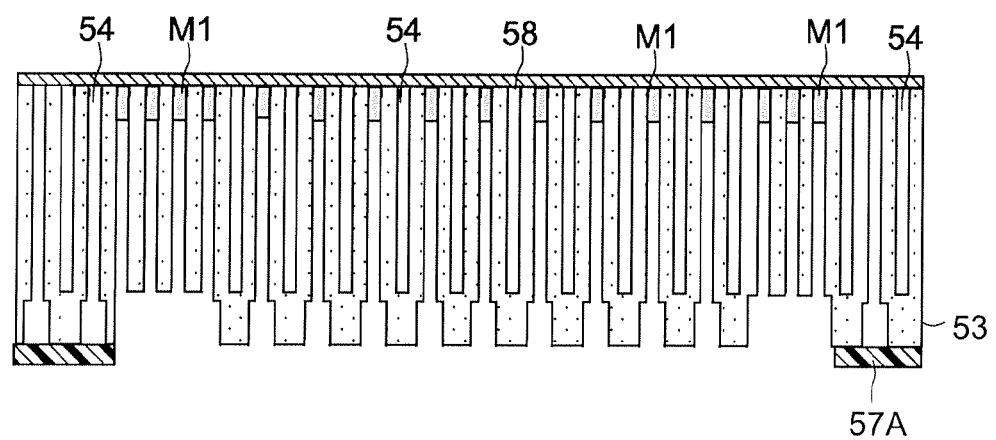

Next, as shown in FIG. 19B, by etching the rear surface of the metal base material 50, the bottom of the first hole 54 in the area in which the opening 51 is formed is opened. On the surface of the oxide base material 53 thus obtained, the conductor layer 58 is formed. On the rear surface of the oxide base material 53, the resist pattern 57A covering the resin filling area A22 is formed. Then, by an electrolytic plating method in which the conductor layer 58 is used as a seed layer, the first plating conductor M1 is caused to grow in the first hole 54 in the area opened from the resist pattern 57A (electrode facing area A21, metal layer forming area A23) (FIG. 19B).

In the first hole 54 in which the first plating conductor M1 is formed, the second conductor M2 is further filled. Thus, the first electrode column 59a electrically connected to the first external electrode layer 121 is formed. Therefore, the first electrode column 59a is formed not only in the electrode facing area A21 but also in the metal layer forming area A23.

Figure 19C:
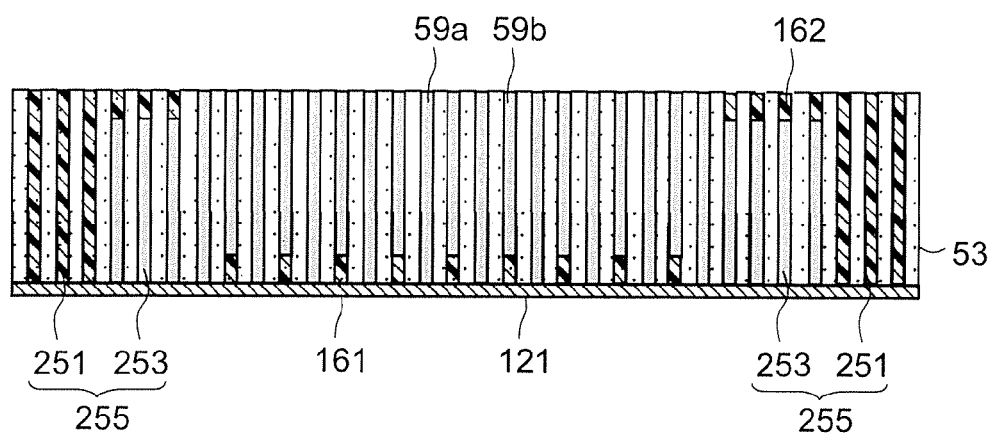

After that, through the same processes as those in the above-mentioned embodiments, as shown in FIG. 19C, the first and second electrode columns 59a and 59b are formed in the electrode facing area A21, the resin material layer 251 is formed in the resin filling area A22, and the metal material layer 253 are formed in the metal layer forming area A23.

After that, as is the case with the above-mentioned embodiments, the surface of the first electrode column 59a is etched by electrolytic etching in which the first external electrode layer 121 is used as a seed layer, and the insulating layer 162 is formed in the etched area. Next, the second external electrode layer 122, and the first and second protective layers 141 and 142 are successively formed, thereby producing the capacitor main body 300. Then, the first and second external terminals 101 and 102 are formed on the first and second end surfaces 11 and 12 of the capacitor main body. Thus, the capacitor 30 according to this embodiment is produced.

Fourth Embodiment

Figure 20:
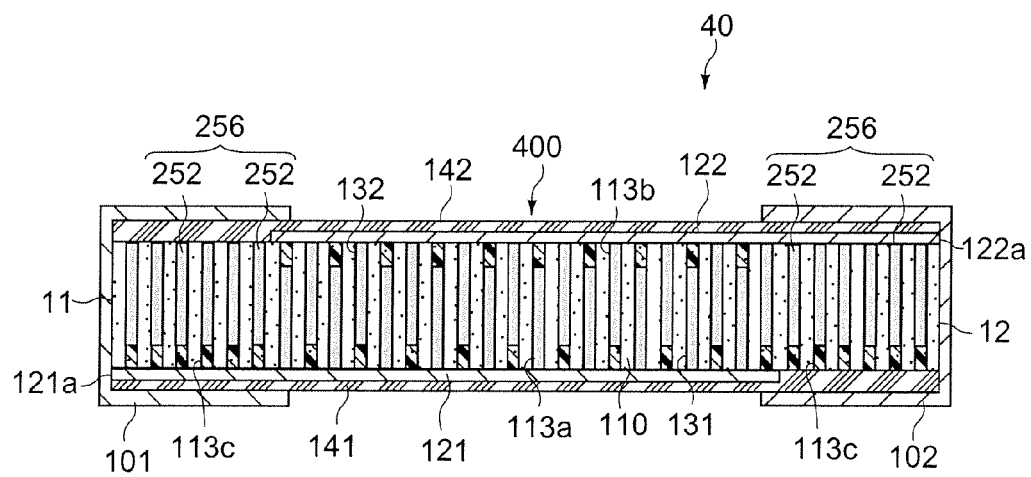
FIG. 20 is a cross-sectional side view showing a schematic configuration of a capacitor according to a fourth embodiment of the present disclosure.
Figure 21:
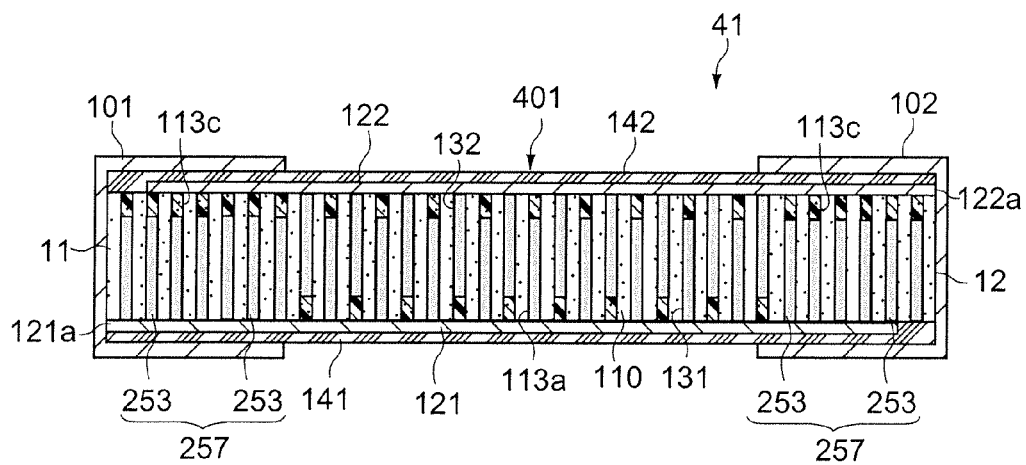
FIG. 21 is a cross-sectional side view showing a schematic configuration of a capacitor according to a fifth embodiment of the present disclosure.

FIGS. 20 and 21 are schematic cross-sectional views showing a configuration of a capacitor according to a fourth embodiment of the present disclosure. Hereinafter, a configuration different from that in the first and second embodiments will be mainly described. The same configuration as that of the above-mentioned embodiments will be denoted by the same reference symbols and a description thereof will be omitted or simplified.

A capacitor 40 shown in FIG. 20 includes a capacitor main body 400 including a close contact portion 256 configured of the plurality of metal material layers 252 having a columnar shape. Because another configuration of the capacitor main body 400 is the same as that in the first embodiment, the description thereof will be omitted.

The metal material layer 252 is formed in the plurality of through-hole portions 113c located in the annular area having a substantially rectangular shape, which surrounds the outside of the electrode facing area of the capacitor main body 400. One end of the metal material layer 252 is connected to the second external electrode layer 122, and the other end of the metal material layer 252 is insulated from the first external electrode layer 121.

Specifically, the capacitor main body 400 according to this embodiment has a configuration in which the resin filling area described in the first embodiment is replaced with the area in which the metal material layer 252 is formed. With such a configuration, the second external electrode layer 122 is tightly brought into close contact with the dielectric layer 110, and it is possible to prevent the second external electrode layer 122 from being removed from the dielectric layer 110.

On the other hand, a capacitor 41 shown in FIG. 21 includes a capacitor main body 401 including a close contact portion 257 configured of the plurality of metal material layers 253 having a columnar shape. Because another configuration of the capacitor main body 401 is the same as that in the first embodiment, the description thereof will be omitted.

The metal material layer 253 is formed in the plurality of through-hole portions 113c located in the annular area having a substantially rectangular shape, which surrounds the outside of the electrode facing area of the capacitor main body 401. One end of the metal material layer 253 is connected to the first external electrode layer 121, and the other end of the metal material layer 253 is insulated from the second external electrode layer 122.

Specifically, the capacitor main body 401 according to this embodiment has a configuration in which the resin filling area described in the first embodiment is replaced with the area in which the metal material layer 253 is formed. With such a configuration, the first external electrode layer 121 is tightly brought into close contact with the dielectric layer 110, and it is possible to prevent the first external electrode layer 121 from being removed from the dielectric layer 110.

The present inventors have produced 1000 samples of a capacitor in which a plurality of a metal material layers having a columnar shape are formed as a close contact portion at the outer periphery (metal layer forming area) of an electrode facing area so as to have a width ranging from 0.5 to 0.8 μm, which is connected to one external electrode layer, and have evaluated whether there is removal of both of the external electrode layers by using an optical microscope with a magnification of 80×. As a result, the proportion of samples in which the removal of the external electrode layer connected to the metal material layer having a columnar shape has been detected is 0.6%, and the proportion of samples in which the removal of the external electrode layer not connected to the metal material layer having a columnar shape has been detected is 1.2%.

Although embodiments of the present disclosure have been described, the present disclosure is not limited to only the above-mentioned embodiments and may be modified without departing from the gist of the present disclosure.

Figure 22:
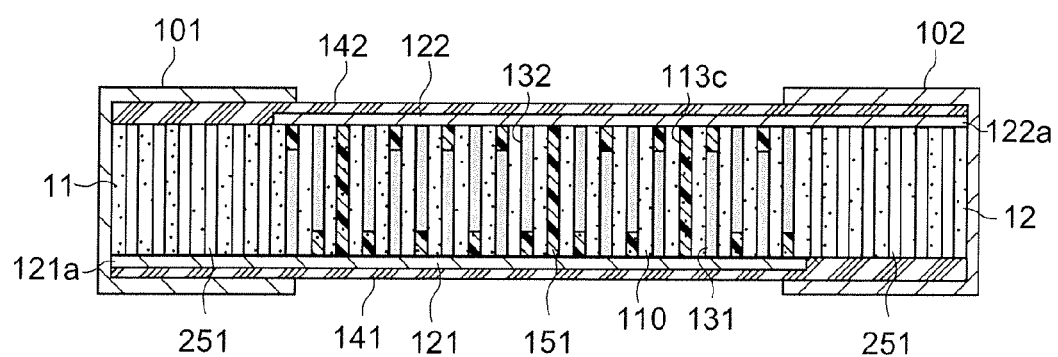
FIG. 22 is a cross-sectional side view showing an alternative of the configuration of the capacitor according to the first embodiment of the present disclosure.

For example, in the first embodiment, an example in which the close contact portion 150 including the plurality of resin material layers having a columnar shape is formed on the outside of the electrode facing area has been mainly described. However, instead of this, the resin material layers having a columnar shape may be dispersively formed in only the electrode facing area. FIG. 22 shows a configuration example of a capacitor in which a resin material layer 151 serving as a close contact portion is dispersively formed in the electrode facing area.

The present inventors have produced 1000 samples of a capacitor in which the resin material layer having a columnar shape is dispersively formed in the electrode facing area of the dielectric layer, and have evaluated whether there is removal of both of the external electrode layers by using an optical microscope with a magnification of 80×. As a result, the proportion of samples in which the removal has been detected is 1.0%.

The capacitor according to each of the embodiments is not limited to the case where it is implemented alone, and may be concurrently implemented. For example, although in the second and third embodiments, an example in which the metal material layer constituting the close contact portion includes the metal material layer 252 connected to the second electrode layer 122 or the metal material layer 253 connected to the external electrode layer 121 alone has been described, the close contact portion may include the two types of metal material layers.

What is claimed is:

1. A capacitor, comprising:
    a dielectric layer including
        a first surface,
        a second surface facing the first surface, and
        a plurality of through-holes communicating between the first surface and the second surface, the plurality of through-holes including a first plurality of through-hole portions, a second plurality of through-hole portions, and a third plurality of through-hole portions, the first surface and the second surface communicating with each other through the first plurality of through-hole portions, the second plurality of through-hole portions, and the third plurality of through-hole portions;
    a first external electrode layer disposed on the first surface;
    a second external electrode layer disposed on the second surface;
    a plurality of first internal electrode portions provided in the first plurality of through-hole portions, one end of each of the first internal electrode portions being connected to the first external electrode layer, the other end of each of the first internal electrode portions being insulated from the second external electrode layer;
    a plurality of second internal electrode portions provided in the second plurality of through-hole portions, one end of each of the second internal electrode portions being connected to the second external electrode layer, the other end of each of the second internal electrode portions being insulated from the first external electrode layer; and
    a plurality of close contact portions bringing at least one of the first external electrode layer and the second external electrode layer into close contact with the dielectric layer, the plurality of close contact portions being provided in the third plurality of through-hole portions, the plurality of close contact portions including a plurality of resin material layers; wherein each of the plurality of resin material layers are connected to the first external electrode layer and the second external electrode layer, the plurality of resin material layers filling the third plurality of through-hole portions.

2. The capacitor according to claim 1, wherein
the third plurality of through-hole portions is provided on the periphery of the dielectric layer.

3. The capacitor according to claim 1, wherein
the plurality of close contact portions includes a plurality of metal material layers connected to any one of the first external electrode layer and the second external electrode layer, the plurality of metal material layers being arranged on the periphery of the dielectric layer.

4. The capacitor according to claim 1, wherein
the dielectric layer includes a first area, a second area, and a third area;
wherein the first area includes the first plurality of through-hole portions and the second plurality of through-hole portions;
wherein the second area includes a part of the third plurality of through-hole portions, the second area being provided on an outer periphery side of the first area;
wherein the third area is provided between the first area and the second area, the third area including the remaining portions of the third plurality of through-hole portions;
wherein the plurality of resin material layers is provided on the third plurality of through-hole portions in the second area, the plurality of resin material layers being connected to the first external electrode layer and the second external electrode layer; and
wherein the plurality of the close contact portions includes a plurality of metal material layers provided on the third plurality of through-hole portions in the third area, the plurality of metal material layers being connected to any one of the first external electrode layer and the second external electrode layer.

* * * * *